United States Patent
Chang et al.

(10) Patent No.: US 12,066,601 B2
(45) Date of Patent: Aug. 20, 2024

(54) IMAGING LENS ELEMENT ASSEMBLY AND IMAGING LENS ASSEMBLY MODULE

(71) Applicant: LARGAN PRECISION CO., LTD., Taichung (TW)

(72) Inventors: Lin-An Chang, Taichung (TW); Ming-Ta Chou, Taichung (TW); Cheng-Feng Lin, Taichung (TW); Ming-Shun Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 750 days.

(21) Appl. No.: 17/192,919

(22) Filed: Mar. 5, 2021

(65) Prior Publication Data

US 2021/0333518 A1    Oct. 28, 2021

(30) Foreign Application Priority Data

Apr. 27, 2020   (TW) .................................. 109114070

(51) Int. Cl.
*G03B 17/12* (2021.01)
*G02B 13/00* (2006.01)

(52) U.S. Cl.
CPC ......... *G02B 13/0045* (2013.01); *G03B 17/12* (2013.01)

(58) Field of Classification Search
CPC ...... G02B 13/0045; G02B 9/62; G02B 7/021; G02B 7/022; G02B 27/0018; G02B 5/003; G02B 13/0015; G02B 13/0055; G02B 5/005; G02B 7/00; G02B 7/02; G02B 7/025; G02B 7/026; G02B 13/004;
(Continued)

(56) References Cited

U.S. PATENT DOCUMENTS

| 8,455,810 B2 | 6/2013 | Tomioka et al. |
| 8,526,129 B2 * | 9/2013 | Hirata .................... G02B 7/021 359/819 |

(Continued)

FOREIGN PATENT DOCUMENTS

| CN | 103460106 B | 8/2015 |
| CN | 104552747 B | 2/2017 |

(Continued)

*Primary Examiner* — Thomas K Pham
*Assistant Examiner* — Jennifer A Jones
(74) *Attorney, Agent, or Firm* — McClure, Qualey & Rodack, LLP

(57) ABSTRACT

An imaging lens element assembly includes a dual molded lens element. The dual molded lens element includes a transparent portion, a light absorbing portion and a step structure. The transparent portion, in order from a center to a peripheral region, includes an optical effective area and a transparent peripheral area, wherein an optical axis of the imaging lens element assembly passes through the optical effective area, and the transparent peripheral area surrounds the optical effective area. The light absorbing portion surrounds the optical effective area and is disposed on an object side of the transparent peripheral area and includes an object-end surface and an outer inclined surface. The object-end surface faces towards an object side of the light absorbing portion, and the outer inclined surface extends from the object-end surface to an image side of the light absorbing portion and is gradually far away from the optical axis.

24 Claims, 28 Drawing Sheets

(58) Field of Classification Search
CPC . G03B 17/12; B29C 45/0062; B29C 45/1675; B29C 2045/1637; B29C 2045/0089; B29D 11/00403; B29L 2011/0016; B29L 2012/00
USPC ................ 359/738, 739, 740, 819, 821, 827
See application file for complete search history.

(56) References Cited

U.S. PATENT DOCUMENTS

| | | | |
|---|---|---|---|
| 9,164,253 B2 | 10/2015 | Koike | |
| 9,170,402 B2 | 10/2015 | Wolterink et al. | |
| 9,279,953 B2 | 3/2016 | Hou | |
| 9,561,609 B2 | 2/2017 | Hou | |
| 9,561,784 B2 | 2/2017 | Casali | |
| 9,671,527 B2 | 6/2017 | Huang | |
| 9,726,846 B2 | 8/2017 | Bone | |
| 10,126,529 B2 | 11/2018 | Chou | |
| 10,234,658 B2 | 3/2019 | Lin | |
| 10,422,932 B2 | 9/2019 | Chou et al. | |
| 10,451,852 B2* | 10/2019 | Chou | G02B 13/0055 |
| 10,928,560 B2* | 2/2021 | Chou | G02B 5/003 |
| 11,156,903 B2* | 10/2021 | Chen | G03B 17/12 |
| 11,714,267 B2* | 8/2023 | Chen | G02B 3/04 |
| | | | 359/819 |
| 2008/0024887 A1 | 1/2008 | Noda et al. | |
| 2015/0116847 A1 | 4/2015 | Liao | |
| 2017/0322394 A1* | 11/2017 | Chou | G02B 13/0055 |
| 2019/0025600 A1* | 1/2019 | Tang | H04N 23/55 |
| 2020/0003998 A1 | 1/2020 | Chou et al. | |
| 2020/0041749 A1 | 2/2020 | Wang | |
| 2021/0048733 A1* | 2/2021 | Lin | G02B 7/026 |
| 2021/0088752 A1* | 3/2021 | Tang | G02B 9/34 |

FOREIGN PATENT DOCUMENTS

| | | |
|---|---|---|
| CN | 104570256 B | 7/2017 |
| CN | 207528991 U | 6/2018 |
| CN | 108422624 A | 8/2018 |
| CN | 208636507 U | 3/2019 |
| CN | 110095848 A | 8/2019 |
| CN | 209388014 U | 9/2019 |
| TW | 201901211 A | 1/2019 |

* cited by examiner

IMAGING LENS ELEMENT ASSEMBLY AND IMAGING LENS ASSEMBLY MODULE

RELATED APPLICATIONS

This application claims priority to Taiwan Application Serial Number 109114070, filed Apr. 27, 2020, which is herein incorporated by reference.

BACKGROUND

Technical Field

The present disclosure relates to an imaging lens element assembly and an imaging lens assembly module. More particularly, the present disclosure relates to an imaging lens element assembly and an imaging lens assembly module applied on a portable electronic device.

Description of Related Art

In recent years, the portable electronic devices have been developed rapidly, such as smart devices, tablets and so on. These portable electronic devices have been full of daily lives of modern people, and the imaging lens assembly module and the imaging lens element assembly mounted on the portable electronic devices have also flourished. The quality requirements for the imaging lens assembly module and the imaging lens element assembly are also enhanced. Therefore, developing an imaging lens element assembly which is both compact, easy to manufacture and has good imaging effect has become an important and urgent problem of the industry.

SUMMARY

According to one aspect of the present disclosure, an imaging lens element assembly includes a dual molded lens element. The dual molded lens element includes a transparent portion, a light absorbing portion and a step structure. The transparent portion, in order from a center to a peripheral region, includes an optical effective area and a transparent peripheral area. An optical axis of the imaging lens element assembly passes through the optical effective area, and the transparent peripheral area surrounds the optical effective area. The light absorbing portion surrounds the optical effective area. The light absorbing portion is disposed on an object side of the transparent peripheral area and includes an object-end surface and an outer inclined surface. The object-end surface faces towards an object side of the light absorbing portion. The outer inclined surface extends from the object-end surface to an image side of the light absorbing portion and is gradually far away from the optical axis. The step structure is connected to a first outer diameter surface of the light absorbing portion and a second outer diameter surface of the transparent portion. When a distance from the object-end surface to the step structure is Ld, a diameter of the first outer diameter surface is $\psi D$ and a diameter of a minimum opening of the light absorbing portion is $\psi d$, the following condition is satisfied: $0.6 < Ld/((\psi D - \psi d)/2) < 2.5$.

According to another one aspect of the present disclosure, an imaging lens assembly module includes the imaging lens element assembly according to the aforementioned aspect and a plastic barrel. The plastic barrel contains the imaging lens element assembly. The minimum opening of the light absorbing portion of the dual molded lens element of the imaging lens element assembly includes a tip minimum opening and two shrinking surfaces. The tip minimum opening forms an aperture stop of the imaging lens assembly module. The shrinking surfaces shrink from the object side and the image side of the light absorbing portion to the tip minimum opening, respectively.

According to another one aspect of the present disclosure, an imaging lens assembly module includes an imaging lens element assembly and a plastic barrel. The imaging lens element assembly includes a dual molded lens element. The dual molded lens element includes a transparent portion and a light absorbing portion. The transparent portion, in order from a center to a peripheral region, includes an optical effective area and a transparent peripheral area. An optical axis of the imaging lens element assembly passes through the optical effective area. The transparent peripheral area surrounds the optical effective area. The light absorbing portion surrounds the optical effective area. The light absorbing portion is disposed on an object side of the transparent peripheral area and includes an object-end surface and an outer inclined surface. The object-end surface faces towards an object side. The outer inclined surface extends from the object-end surface to an image side of the light absorbing portion and is gradually far away from the optical axis. The plastic barrel contains the imaging lens element assembly and includes a top surface. The top surface faces towards an object side of the imaging lens assembly module. The object-end surface is disposed on an object side of the top surface. When a distance from the object-end surface to the top surface is Lo, the following condition is satisfied: $0.3 \text{ mm} < Lo < 1.5 \text{ mm}$.

BRIEF DESCRIPTION OF THE DRAWINGS

The present disclosure can be more fully understood by reading the following detailed description of the embodiment, with reference made to the accompanying drawings as follows:

FIG. 10 is a partial cross-sectional view of the imaging lens element assembly according to the 1st embodiment of FIG. 1A.

DETAILED DESCRIPTION

Figure 1A:
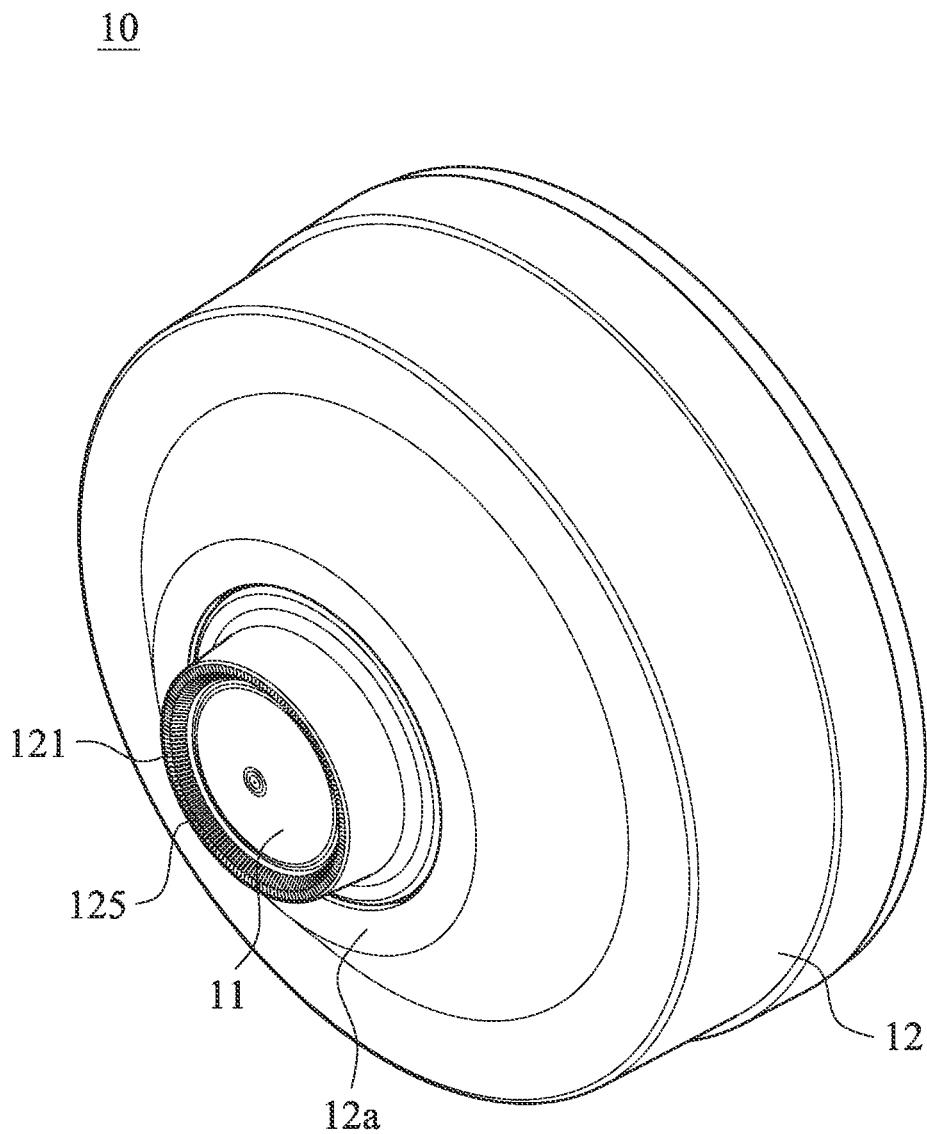
FIG. 1A is a three-dimensional view of an imaging lens assembly module according to the 1st embodiment of the present disclosure.

The present disclosure provides an imaging lens element assembly including a dual molded lens element. The dual molded lens element includes a transparent portion and a light absorbing portion. The transparent portion, in order from a center to a peripheral region, includes an optical effective area and a transparent peripheral area, wherein an optical axis of the imaging lens element assembly passes through the optical effective area, and the transparent peripheral area surrounds the optical effective area. The light absorbing portion surrounds the optical effective area and is disposed on an object side of the transparent peripheral area.

The light absorbing portion includes an object-end surface and an outer inclined surface. The object-end surface faces towards an object side of the light absorbing portion, and the outer inclined surface extends from the object-end surface to an image side of the light absorbing portion and is gradually far away from the optical axis. Therefore, the dual molded lens element with small head structure can be provided to provide the feasibility of compactness of the imaging lens assembly module. Further, the object-end surface and the outer inclined surface can replace the peripheral light-shielding function of the conventional lens barrel, so that the structural complexity of the plastic barrel can be simplified, and the collision and the interference between the dual molded lens element and the plastic barrel during assembling can also be prevented.

The imaging lens assembly module can further include a step structure. The step structure is connected to a first outer diameter surface of the light absorbing portion and a second outer diameter surface of the transparent portion. Therefore, the mold design of injection molding can be simplified, and the stability of size accuracy can be improved. Specifically, due to different mold designs and different injection methods, the step structure can be disposed on the light absorbing portion or the transparent peripheral area.

Specifically, the dual molded lens element can be made integrally by dual-shot injection molding. The transparent portion is formed by a first injection molding, then the light absorbing portion is formed by a second injection molding, and the light absorbing portion is tightly connected to the transparent peripheral area of the transparent portion during molding, but the molding sequence will not be limited thereto. The transparent portion can be a transparent plastic material, and the light absorbing portion can be a black plastic material, wherein the light absorbing portion can absorb the non-imaging light.

The outer inclined surface forms an included angle (not shown) with the optical axis X. The included angle can be 1 degree to 40 degrees, so that a draft angle during molding can be provided, but the range of the included angle will not be limited thereto.

A minimum opening of the light absorbing portion includes a tip minimum opening and two shrinking surfaces. The tip minimum opening and the optical effective area are contacted with each other so as to form an aperture stop of the imaging lens assembly module, and the shrinking surfaces shrink from the object side and the image side of the light absorbing portion to the tip minimum opening, respectively. Specifically, the tip minimum opening is the aperture stop of the imaging lens assembly module, which can control the amount of the light entering the imaging lens assembly module, wherein the diameter of the tip minimum opening is the diameter of the minimum opening of the light absorbing portion. Further, the design of the aperture stop can be controlled by the precision of the mold, so that the aperture stop of the dual molded lens element after molding can be directly disposed concentrically with the optical effective area. Therefore, it is favorable for directly avoiding the assembling tolerance by the arrangement described in the present disclosure, which is different from the traditional lens assembly having the light shielding element as the aperture stop.

The dual molded lens element can further include at least one trace structure. The trace structure extends from the light absorbing portion to the transparent peripheral area. Specifically, the surface property of the trace structure is different from the surface property of the portion near the trace structure, and the trace structure has no specific shape.

Therefore, the molds in the dual-shot injection molding matching to each other can be provided, and the manufacturing process can be simplified and the productivity can be increased. In detail, the surface of the trace structure can be a transparent plastic, a black plastic, a partially transparent plastic and a partially black plastic or a mixture of transparent plastic and black plastic, but the present disclosure will not be limited thereto.

The optical effective area can include an object-side surface and an image-side surface. One of the object-side surface and the image-side surface is aspheric. Therefore, the high-precision light bending force can be provided, and the optical aberration can be reduced. In detail, since the tip minimum opening is contacted with the object-side surface of the optical effective area, the range of the object-side surface of the optical effective area can be directly defined.

The light absorbing portion can include at least one light diminishing structure. The light diminishing structure is composed of a plurality of stripe-shaped grooves. The stripe-shaped grooves are arranged in at least one manner of being arranged in a circumferential direction and surrounding the optical axis of the imaging lens element assembly as a center. Therefore, the ability of the light absorbing portion to absorb the stray light can be enhanced, and the feasibility of molding can be maintained. Specifically, the light diminishing structure is disposed on the junction of the transparent portion and the light absorbing portion by the manner that the stripe-shaped grooves surround the optical axis of the imaging lens element assembly as the center. Therefore, the plastic of the dual-shot injection molding can be joined more tightly.

The light diminishing structure can be disposed on at least one of the two shrinking surfaces. Specifically, the light diminishing structure can be disposed on the shrinking surface of the object side or the image side of the tip minimum opening. In detail, the high-intensity stray light is easily generated around the tip minimum opening, so that the shrinking surfaces need to have a higher efficiency of light absorbing ability. Therefore, the efficiency for eliminating the stray light around the tip minimum opening can be improved by disposing the light diminishing structure on the shrinking surfaces.

In detail, the light absorbing portion can have barb structure. Therefore, the plastic of dual-shot injection molding can be joined more tightly.

The imaging lens element assembly can further include an image lens element. The image lens element is disposed on an image side of the dual molded lens element. Specifically, the dual molded lens element is disposed on the most object side of the imaging lens element assembly. The dual molded lens element can further include an axial connecting structure. The axial connecting structure is located at the transparent peripheral area and corresponds to the image lens element. The axial connecting structure can include an annular plane and an inclined-tapered surface. The annular plane and the inclined-tapered surface are for axially connecting to the image lens element. In detail, a center of the dual molded lens element is aligned with a center of the image lens element being adjacent thereto along the direction parallel to the optical axis by the axial connecting structure, that is, the position of the centers are located on the optical axis. Therefore, the concentricity between the dual molded lens element and the image lens element can be increased and the assembling efficiency can be enhanced.

When a distance from the object-end surface to the step structure is Ld, a diameter of the first outer diameter surface is $\psi D$, and a diameter of a minimum opening of the light absorbing portion is $\psi d$, the following condition can be satisfied: $0.6<Ld/((\psi D-\psi d)/2)<2.5$. Therefore, the higher light shielding efficiency can be exerted by the light absorbing portion. Further, the following condition can be satisfied: $0.8<Ld/((\psi D-\psi d)/2)<2.2$. Therefore, the light absorbing portion can have a higher light shielding efficiency.

When the diameter of the first outer diameter surface is $\psi D$, and an outer diameter of the object-end surface is $\psi o$, the following condition can be satisfied: $0.40<\psi o/\psi D<0.75$. Therefore, the better light shielding effect under the compact structure can be obtained.

When a central thickness of the optical effective area is CT, and a distance from an image-side center of the optical effective area to the object-end surface is FT, the following condition can be satisfied: $1.0<FT/CT<1.2$. Therefore, the structure design which can effectively prevent the component interference can be still maintained under the condition of maintaining optical specification.

When a central thickness of the optical effective area is CT, and a minimum thickness of the transparent peripheral area is ET min, the following condition can be satisfied: ET min/CT<0.35. Specifically, the structure with narrowed outer circumference can improve the uneven filling of plastic during injection molding, and the molding yield can be enhanced. Further, the following condition can be satisfied: ET min/CT≤0.25. Specifically, with the narrowed structure at a specific ratio, the flowing speed and flowing direction of the plastic material will be more stable, and the probability of the stray light generated in the transparent peripheral area can be reduced.

When the distance from the object-end surface to the step structure is Ld, the following condition can be satisfied: 0.5 mm<Ld<2.0 mm. Therefore, a wide range of light shielding can be provided to prevent non-imaging light from the peripheral area entering the imaging system of the imaging lens element assembly.

When an outer diameter of the object-side surface is $\psi Y$, and the diameter of the minimum opening of the light absorbing portion is $\psi d$, the following condition can be satisfied: $0.7<\psi d/\psi \leq 1$. Therefore, the probability of reflection in the internal surface of the dual molded lens element and the image lens element can be reduced.

When a distance from the tip minimum opening along a direction parallel to the optical axis towards the object side of the transparent portion to the object-side surface is d1, and a distance from the tip minimum opening along the direction parallel to the optical axis towards the image side of the transparent portion to the image-side surface is d2, the following condition can be satisfied: $0 \leq d1/(d1+d2)<0.8$. Specifically, in the conventional optical design, the light-shielding position of the aperture stop is designed at the outside of the lens element and is kept a specific distance from the optical mirror. However, in the present disclosure, the tip minimum opening can be attached to the object-side surface of the transparent portion, or can be embedded in the transparent portion. Therefore, a more flexible design solution for the position of the aperture stop in the optical design can be provided.

Each of the aforementioned features of the imaging lens element assembly can be utilized in various combinations for achieving the corresponding effects.

The present disclosure provides an imaging lens assembly module including the aforementioned imaging lens element assembly and a plastic barrel. The plastic barrel contains the imaging lens element assembly. In detail, the light absorbing portion can further include an object-side bearing surface. The object-side bearing surface faces towards the object side and is farther away from the optical axis than the outer inclined surface therefrom. The object-side bearing surface is for assembling with the plastic barrel. Therefore, the tip minimum opening can replace the opening of the plastic barrel for light shielding, so that the structure of the opening of the plastic barrel can be simplified, and the manufacturing cost of the plastic barrel can be reduced.

The plastic barrel includes a top surface. The top surface faces towards an object side of the imaging lens assembly module, and the object-end surface of the light absorbing portion is located at the object side of the top surface. In detail, the object-end surface and the top surface are substantially perpendicular to the optical axis.

The dual molded lens element can further include an axial connecting structure corresponding to the plastic barrel. The axial connecting structure corresponding to the plastic barrel is located at the transparent peripheral area. Therefore, the center of the dual molded lens element is aligned with the center of the plastic barrel along the direction parallel to the optical axis.

When a distance from the object-end surface to the top surface is Lo, the following condition can be satisfied: $0.3 \text{ mm} < \text{Lo} < 1.5 \text{ mm}$. Therefore, the small head structure will not be limited to the space configuration of the plastic barrel, and the design of the dual molded lens element being set closer to the object side can be achieved.

When a diameter of a minimum opening of the plastic barrel is $\psi b$, and an outer diameter of the object-end surface is $\psi o$, the following condition can be satisfied: $0.5 < \psi o/\psi b \leq 0.95$. Therefore, the collision during assembling can be effectively prevented, and the structural integrity of the dual molded lens element can be maintained.

When a focal length of the imaging lens element assembly is f, and a diameter of a minimum opening of the light absorbing portion is $\psi d$, the following condition can be satisfied: $1.15 < f/\psi d < 2.80$. Therefore, the high specification optical quality can be maintained under the compactness design of the imaging lens assembly module. Further, the following condition can be satisfied: $1.45 \leq f/\psi d \leq 2.50$. Therefore, it is favorable for arranging the proper range by maintaining the balance of the optical quality and the compactness.

According to the above description of the present disclosure, the following specific embodiments are provided for further explanation.

1st Embodiment

Figure 1B:
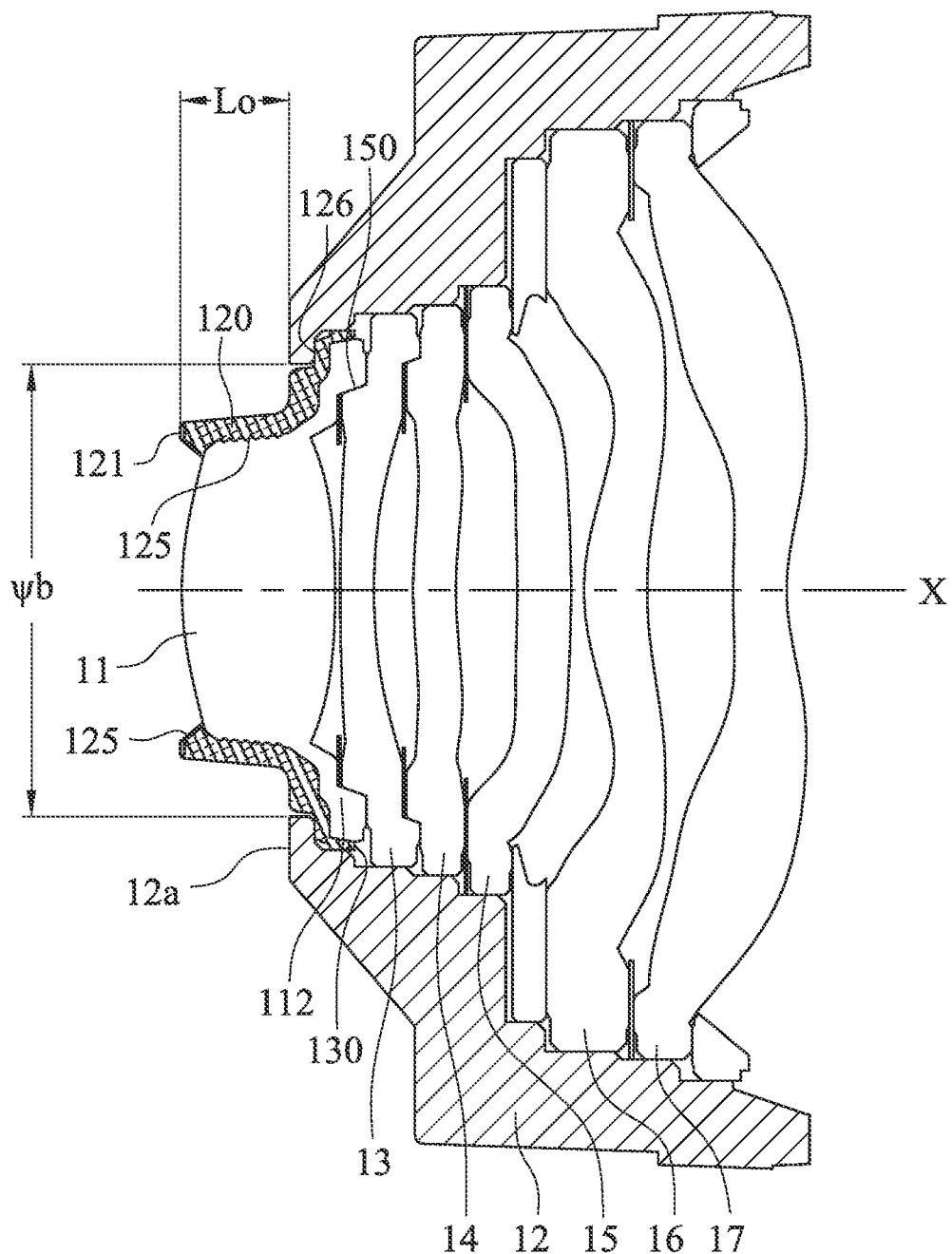
FIG. 1B is a schematic view of the imaging lens element assembly according to the 1st embodiment of FIG. 1A.
Figure 1C:
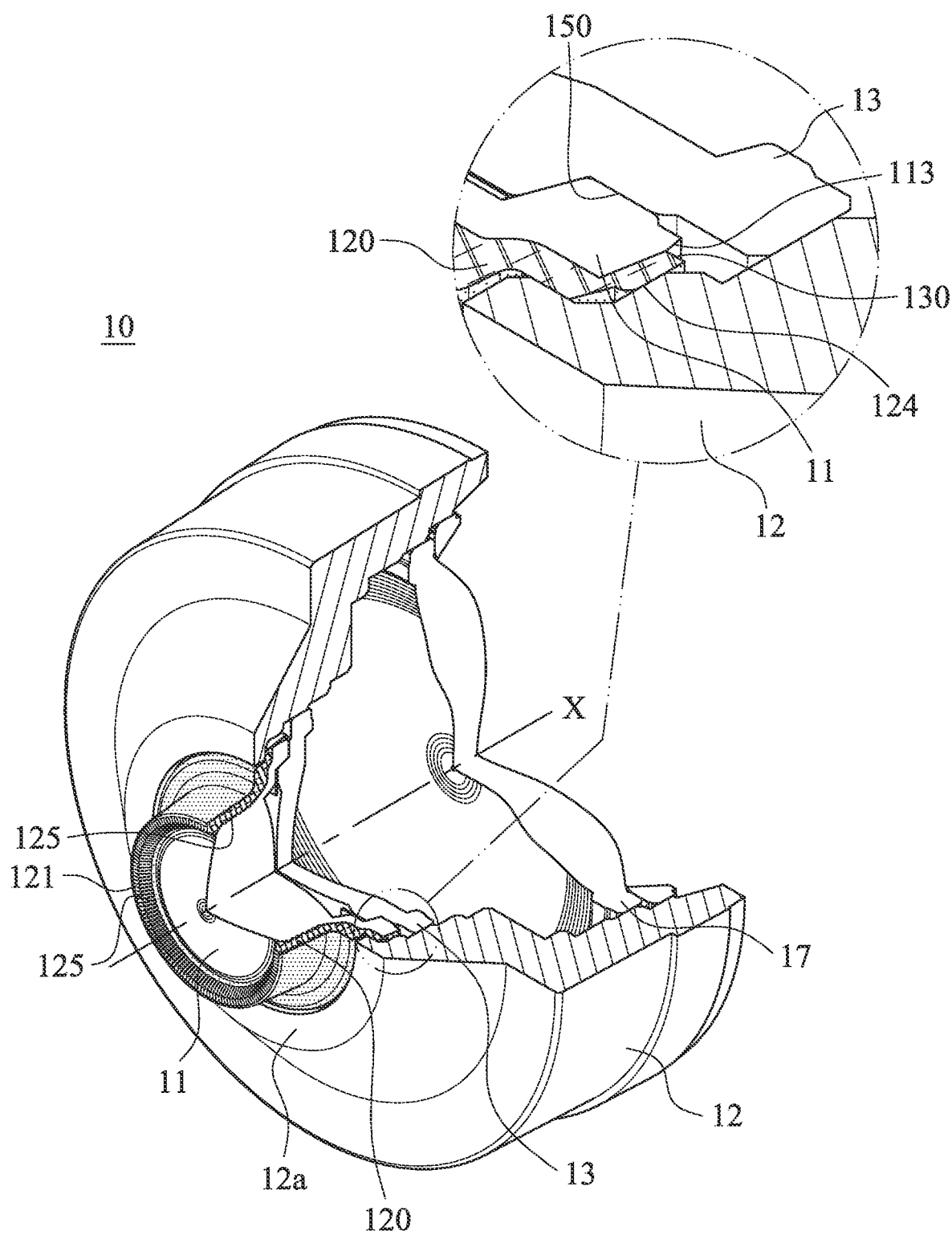
FIG. 1D is a schematic view of an object side of a dual molded lens element according to the 1st embodiment of FIG. 1A.
FIG. 1E is a three-dimensional view of the dual molded lens element according to the 1st embodiment of FIG. 1A.
FIG. 1F is another three-dimensional view of the dual molded lens element according to the 1st embodiment of FIG. 1A.
FIG. 1G is a cross-sectional view of the dual molded lens element according to the 1st embodiment of FIG. 1A.
FIG. 1H is a schematic view of parameters of the dual molded lens element according to the 1st embodiment of FIG. 1A.
FIG. 1I is another schematic view of parameters of the dual molded lens element according to the 1st embodiment of FIG. 1A.

FIG. 1A is a three-dimensional view of an imaging lens assembly module 10 according to the 1st embodiment of the present disclosure. FIG. 1B is a schematic view of the imaging lens element assembly 10 according to the 1st embodiment of FIG. 1A. FIG. 1C is a partial cross-sectional view of the imaging lens element assembly 10 according to the 1st embodiment of FIG. 1A. As shown in FIGS. 1A to 10, the imaging lens assembly module 10 includes the imaging lens element assembly (its reference numeral is omitted) and a plastic barrel 12. The imaging lens element assembly includes a dual molded lens element 11. The plastic barrel 12 contains the imaging lens element assembly. The plastic barrel 12 includes a top surface 12a, wherein the top surface 12a faces towards an object side of the imaging lens assembly module 10.

In detail, the imaging lens element assembly further includes an image lens element. The image lens element is disposed on an image side of the dual molded lens element 11. In the 1st embodiment, the imaging lens element assembly, in order from the object side to the image side, includes the dual molded lens element 11, image lens elements 13, 14, 15, 16 and 17, wherein the dual molded lens element 11 is disposed on the most object side of the imaging lens element assembly. Further, the optical characteristics of the image lens element, such as number, structure and surface shape, can be configured according to different imaging requirements, other optical elements can be disposed according to requirements and will not be limited thereto.

Figure 1D:
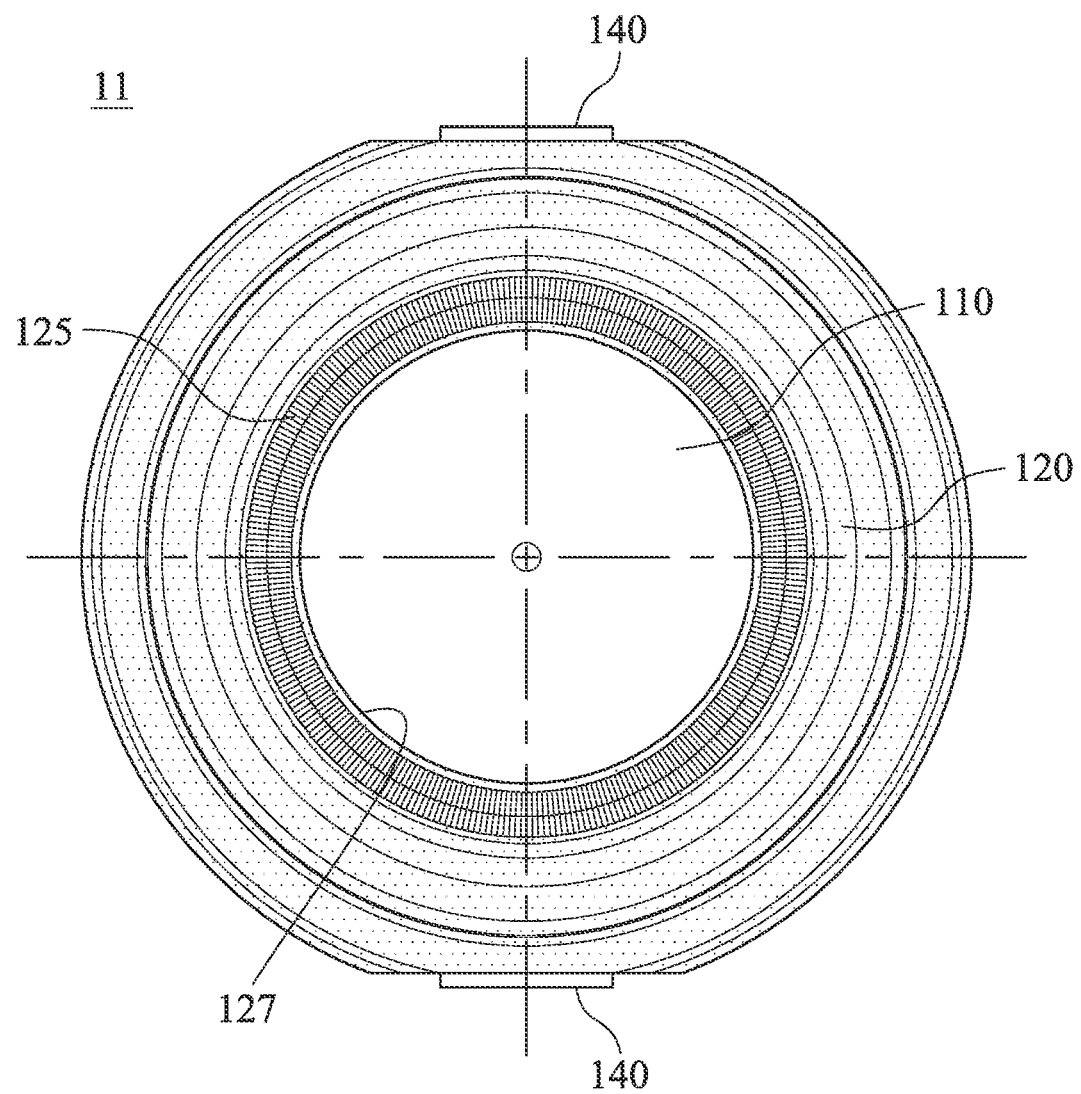
Figure 1E:
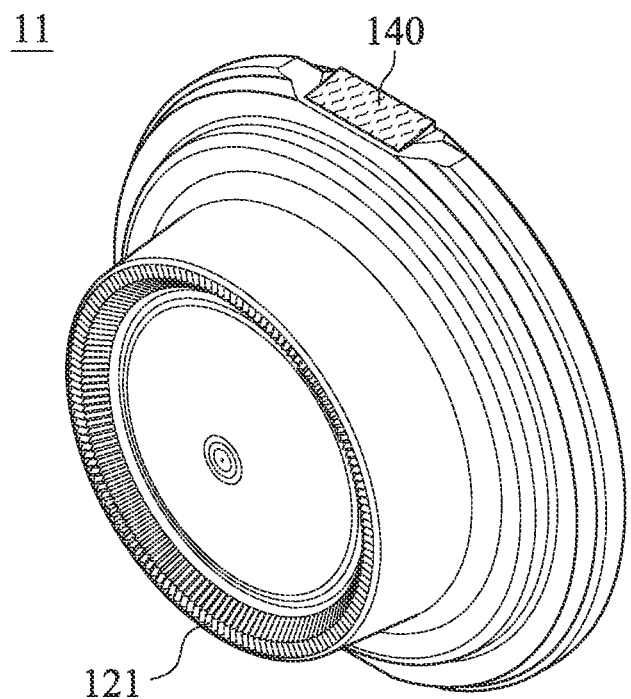
Figure 1F:
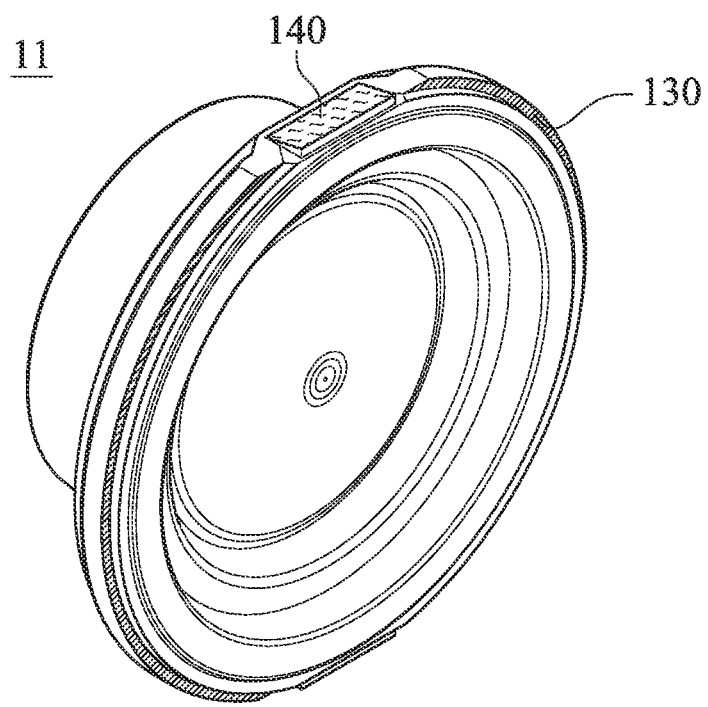
Figure 1G:
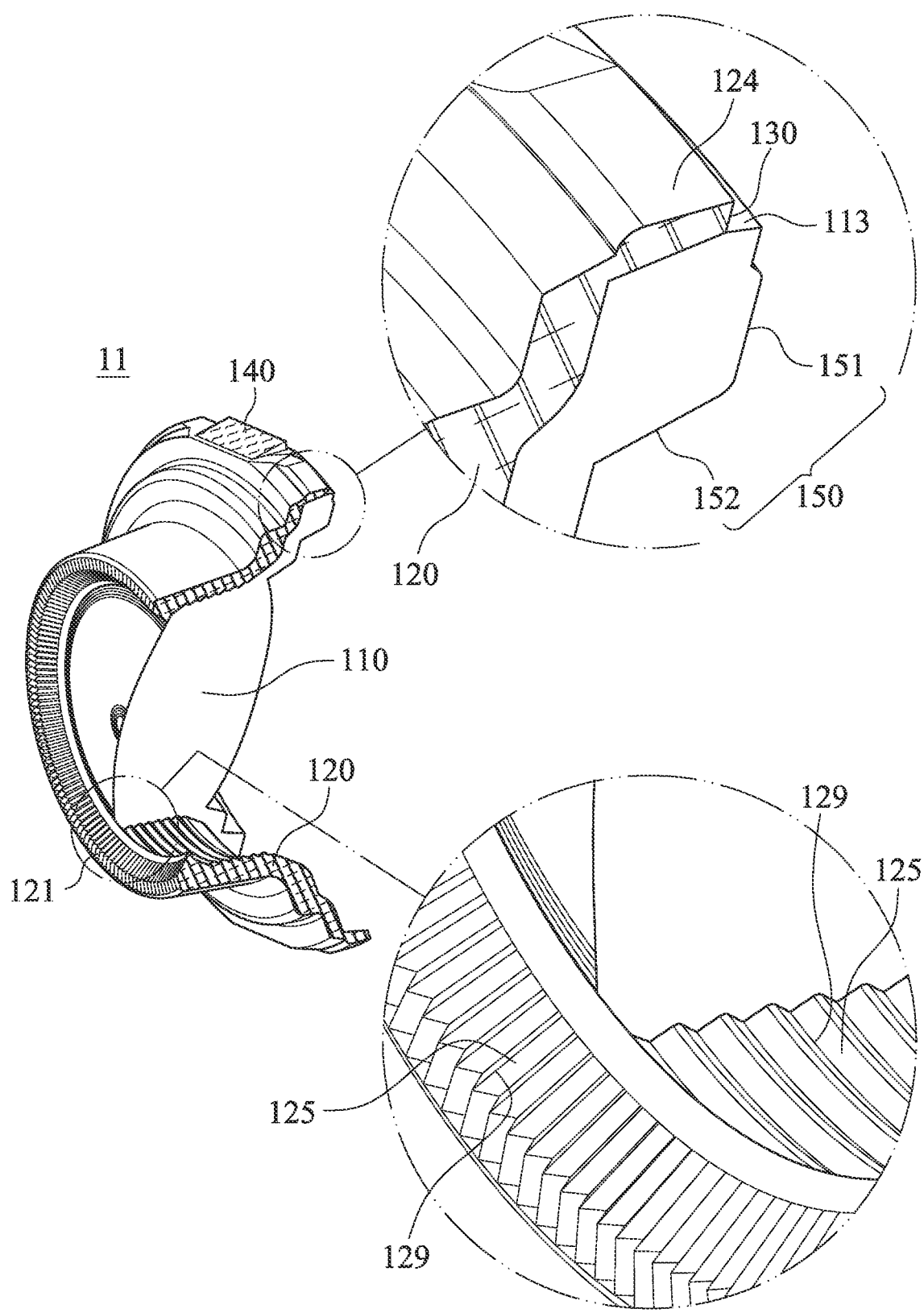

FIG. 1D is a schematic view of the object side of a dual molded lens element 11 according to the 1st embodiment of FIG. 1A. FIG. 1E is a three-dimensional view of the dual molded lens element 11 according to the 1st embodiment of FIG. 1A. FIG. 1F is another three-dimensional view of the dual molded lens element 11 according to the 1st embodiment of FIG. 1A. FIG. 1G is a cross-sectional view of the dual molded lens element 11 according to the 1st embodiment of FIG. 1A. As shown in FIGS. 1D to 1G, the dual molded lens element 11 includes a transparent portion 110, a light absorbing portion 120 and a step structure 130.

Specifically, the dual molded lens element 11 can be made integrally by dual-shot injection molding. The transparent portion 110 is formed by a first injection molding, then the light absorbing portion 120 is formed by a second injection molding, and the light absorbing portion 120 is tightly connected to the transparent peripheral area 112 of the transparent portion 110 during molding, but the molding sequence will not be limited thereto. The transparent portion 110 can be a transparent plastic material, and the light absorbing portion 120 can be a black plastic material, wherein the light absorbing portion 120 can absorb the non-imaging light. Therefore, the present disclosure provides the dual molded lens element 11 with small head structure to provide the feasibility of compactness of the imaging lens assembly module 10.

The transparent portion 110, in order from a center to a peripheral region, includes an optical effective area 111 and the transparent peripheral area 112, wherein an optical axis X of the imaging lens element assembly passes through the optical effective area 111, and the transparent peripheral area 112 surrounds the optical effective area 111. In detail, an imaging light (not shown) of the imaging lens element assembly passes through the optical effective area 111.

The light absorbing portion 120 surrounds the optical effective area 111 and is disposed on an object side of the transparent peripheral area 112. The light absorbing portion 120 includes an object-end surface 121, an outer inclined surface 122 and a minimum opening 123. The object-end surface 121 faces towards the object side, and the outer inclined surface 122 extends from the object-end surface 121 to an image side of the light absorbing portion 120 and is gradually far away from the optical axis X. Therefore, the object-end surface 121 and the outer inclined surface 122 can replace the peripheral light-shielding function of the plastic barrel 12, so that the structural complexity of the plastic barrel 12 can be simplified, and the collision and the interference between the dual molded lens element 11, the image lens elements 13, 14, 15, 16 and 17 and the plastic barrel 12 during assembling can also be prevented.

In detail, the object-end surface 121 is located at an object side of the top surface 12a, and the object-end surface 121 and the top surface 12a are substantially perpendicular to the optical axis X. The outer inclined surface 122 forms an included angle (its reference numeral is omitted) with the optical axis X. The included angle can be 1 degree to 40 degrees, so that a draft angle during molding can be provided, but the range of the included angle will not be limited thereto.

As shown in FIGS. 1O and 1G, the step structure 130 is connected to a first outer diameter surface 124 of the light absorbing portion 120 and a second outer diameter surface 113 of the transparent portion 110. Therefore, the mold design of injection molding can be simplified, and the stability of size accuracy can be improved. Specifically, due to different mold designs and different injection methods, the step structure 130 can be disposed on the light absorbing portion 120 or the transparent peripheral area 112. In the 1st embodiment, the step structure 130 is located on the light absorbing portion 120.

As shown in FIGS. 1D to 1G, the dual molded lens element 11 can further include at least one trace structure. In the 1st embodiment, the number of the trace structures 140 is two, but it will not be limited thereto. The trace structures 140 extend from the light absorbing portion 120 to the transparent peripheral area 112. Specifically, the surface properties of the trace structures 140 are different from the surface property of the portion near the trace structures 140, and the trace structures 140 have no specific shape. In the 1st embodiment, the trace structures 140 are rectangle, but it will not be limited thereto. Therefore, the molds in the dual-shot injection molding matching to each other can be provided, and the manufacturing process can be simplified and the productivity can be increased. In detail, the surfaces of the trace structures 140 can be a transparent plastic, a black plastic, a partially transparent plastic and a partially black plastic or a mixture of transparent plastic and black plastic, but the present disclosure will not be limited thereto.

The minimum opening 123 of the light absorbing portion 120 includes a tip minimum opening 127 and two shrinking surfaces 128. The tip minimum opening 127 and the optical effective area 111 are contacted with each other so as to form an aperture stop of the imaging lens assembly module 10, and the shrinking surfaces 128 shrink from the object side and the image side of the light absorbing portion 120 to the tip minimum opening 127, respectively.

Specifically, the tip minimum opening 127 is the aperture stop of the imaging lens assembly module 10, which can control the amount of the light entering the imaging lens assembly module 10, wherein the diameter of the tip minimum opening 127 is the diameter of the minimum opening 123 of the light absorbing portion 120. Therefore, the tip minimum opening 127 can replace the opening of the plastic barrel 12 for light shielding, so that the structure of the opening of the plastic barrel 12 can be simplified, and the manufacturing cost of the plastic barrel 12 can be reduced.

Further, the design of the aperture stop can be controlled by the precision of the mold, so that the aperture stop of the dual molded lens element 11 after molding can be directly disposed concentrically with the optical effective area 111. Therefore, it is favorable for directly avoiding the assembling tolerance by the arrangement described in the present disclosure, which is different from the traditional lens assembly having the light shielding element as the aperture stop.

As shown in FIGS. 1A to 1D and FIG. 1G, the light absorbing portion 120 includes at least one light diminishing structure. In the 1st embodiment, the number of the light diminishing structures 125 is two. The light diminishing structures 125 are composed of a plurality of stripe-shaped grooves 129. The stripe-shaped grooves 129 are arranged in at least one manner of being arranged in a circumferential direction and surrounding the optical axis X of the imaging lens element assembly as a center. Therefore, the ability of the light absorbing portion 120 to absorb the stray light can be enhanced, and the feasibility of molding can be maintained. In the 1st embodiment, the stripe-shaped grooves 129 of the light diminishing structure 125 near the object side of the dual molded lens element 11 are arranged in the circumferential direction, and the stripe-shaped grooves 129 of the light diminishing structure 125 near the image side of the dual molded lens element 11 surround the optical axis X of the imaging lens element assembly as a center, but it will not be limited thereto. Specifically, the light diminishing structure 125 is disposed on the junction of the transparent portion 110 and the light absorbing portion 120 by the manner that the stripe-shaped grooves 129 surround the optical axis X of the imaging lens element assembly as the center. Therefore, the plastic of the dual-shot injection molding can be joined more tightly.

The light diminishing structures 125 can be disposed on at least one of the two shrinking surfaces 128. Specifically, in the 1st embodiment, the light diminishing structure 125 near the object side of the dual molded lens element 11 is disposed on the shrinking surface 128 of the object side of the tip minimum opening 127. In detail, the high-intensity stray light is easily generated around the tip minimum opening 127, so that the shrinking surfaces 128 need to have a higher efficiency of light absorbing ability. Therefore, the efficiency for eliminating the stray light around the tip minimum opening 127 can be improved by disposing the light diminishing structures 125 on the shrinking surfaces 128.

In detail, as shown in FIG. 1B, the light absorbing portion 120 further includes an object-side bearing surface 126. The object-side bearing surface 126 faces towards the object side and is farther away from the optical axis X than the outer inclined surface 122 therefrom. The object-side bearing surface 126 is for assembling with the plastic barrel 12.

The optical effective area 111 includes an object-side surface 114 and an image-side surface 115. One of the object-side surface 114 and the image-side surface 115 is aspheric. In the 1st embodiment, both of the object-side surface 114 and the image-side surface 115 are aspheric. Therefore, the high-precision light bending force can be provided, and the optical aberration can be reduced. In the 1st embodiment, since the tip minimum opening 127 is contacted with the object-side surface 114 of the optical effective area 111, the range of the object-side surface 114 of the optical effective area 111 can be directly defined.

In detail, in the conventional optical design, the light-shielding position of the aperture stop is designed at the outside of the lens element and is kept a specific distance from the optical mirror. However, in the present disclosure, the tip minimum opening 127 can be attached to the object-side surface 114 of the transparent portion 110 or can be embedded in the transparent portion 110. In the 1st embodiment, the tip minimum opening 127 is attached to the object-side surface 114 of the transparent portion 110, but it will not be limited thereto.

As shown in FIG. 1B, the dual molded lens element 11 further includes an axial connecting structure 150. The axial connecting structure 150 is located at the transparent peripheral area 112 and corresponds to the image lens element 13. Specifically, the dual molded lens element 11 is correspondingly connected to the image lens element 13 through the axial connecting structure 150. In detail, the axial connecting structure 150 of the dual molded lens element 11 includes an annular plane 151 and an inclined-tapered surface 152. The annular plane 151 and the inclined-tapered surface 152 are for axially connecting to the image lens element 13. In detail, a center of the dual molded lens element 11 is aligned with a center of the image lens element 13 being adjacent thereto along the direction parallel to the optical axis X by the axial connecting structure 150. Therefore, the concentricity between the dual molded lens element 11 and the image lens element 13 can be increased and the assembling efficiency can be enhanced.

Figure 1H:
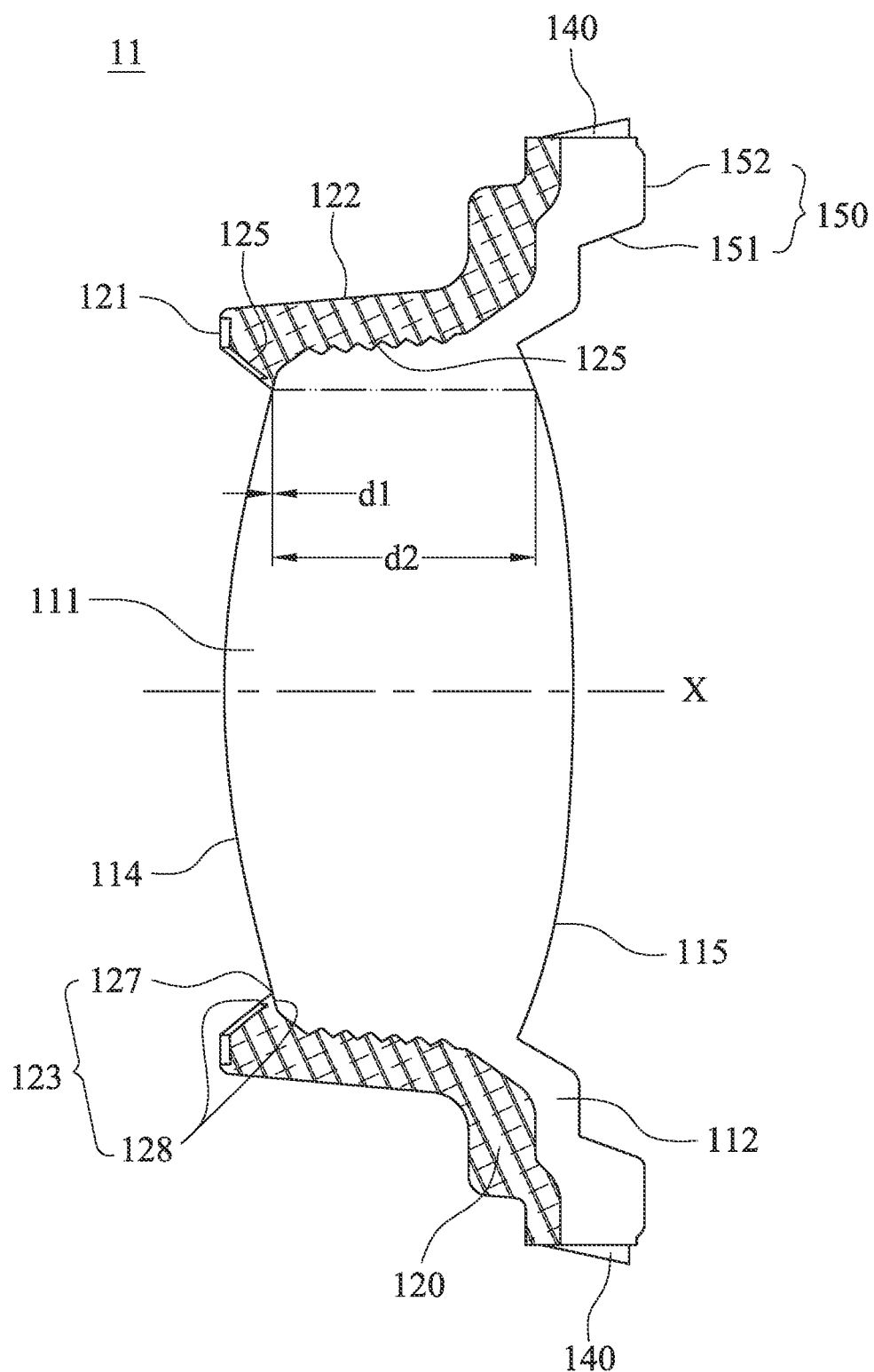
Figure 1I:
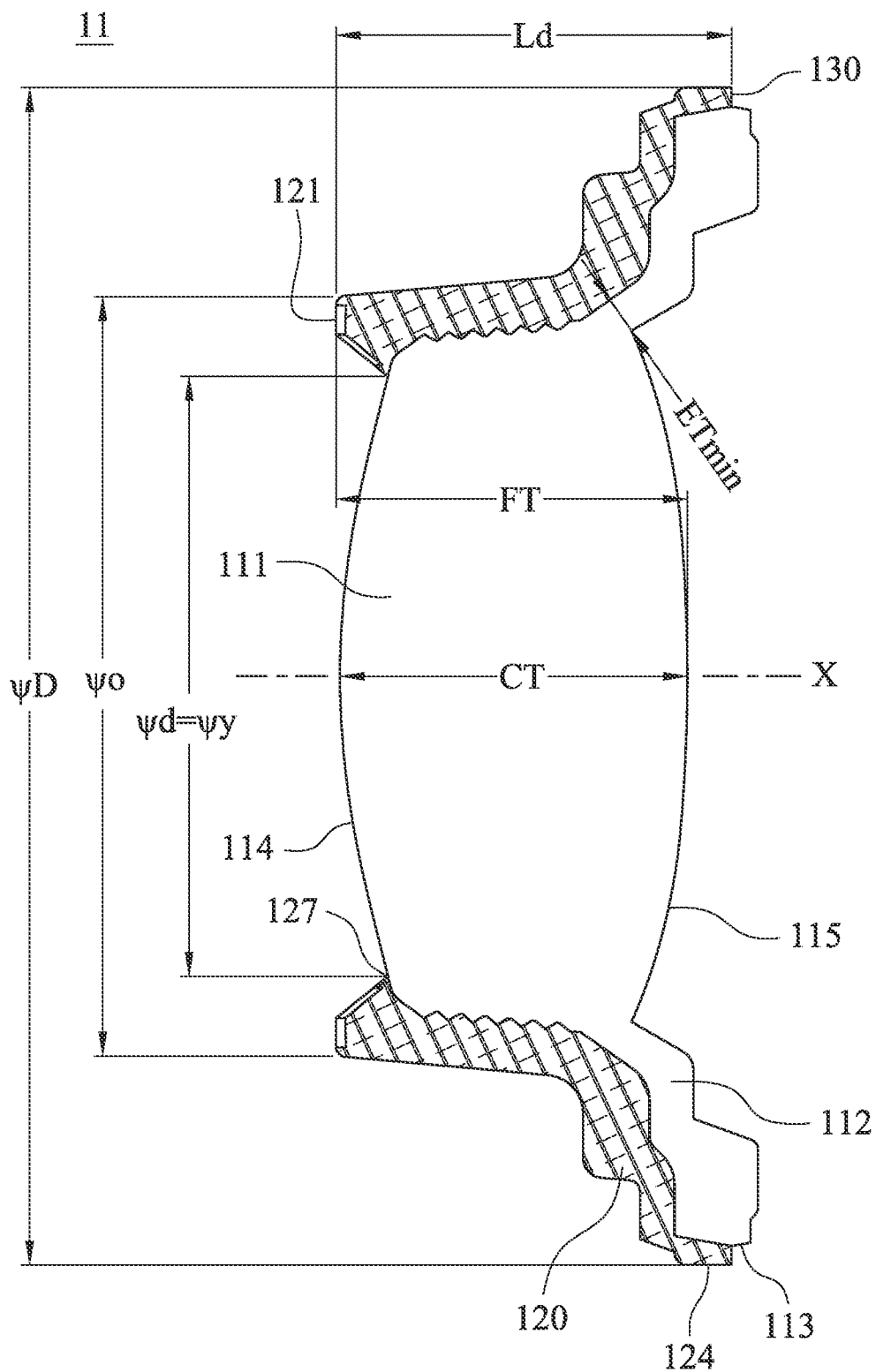

FIG. 1H is a schematic view of parameters of the dual molded lens element 11 according to the 1st embodiment of FIG. 1A. FIG. 1I is another schematic view of parameters of the dual molded lens element 11 according to the 1st embodiment of FIG. 1A. As shown in FIGS. 1B, 1H and 1I, when a distance from the object-end surface 121 to the step structure 130 is Ld, a diameter of the first outer diameter surface 124 is ψD, a diameter of the minimum opening 123 of the light absorbing portion 120 is ψd, an outer diameter of the object-end surface 121 is ψo, a central thickness of the optical effective area 111 is CT, a distance from an image-side center of the optical effective area 111 to the object-end surface 121 is FT, a minimum thickness of the transparent peripheral area 112 is ET min, an outer diameter of the object-side surface 114 is ψY, a distance from the tip minimum opening 127 along a direction parallel to the optical axis X towards the object side of the transparent portion 110 to the object-side surface 114 is d1, a distance from the tip minimum opening 127 along the direction parallel to the optical axis X towards the image side of the transparent portion 110 to the image-side surface 115 is d2, a distance from the object-end surface 121 to the top surface 12a is Lo, a diameter of a minimum opening of the plastic barrel 12 is ψb, and a focal length of the imaging lens element assembly is f, the conditions of the following table 1 can be satisfied.

TABLE 1

| 1st embodiment | | | |
|---|---|---|---|
| Ld (mm) | 1.04 | ψY (mm) | 1.58 |
| ψD (mm) | 3.1 | ψd/ψY | 1 |
| ψd (mm) | 1.58 | d1 (mm) | 0 |
| Ld/((ψD − ψd)/2) | 1.37 | d2 (mm) | 0.69 |
| ψo (mm) | 2 | d1/(d1 + d2) | 0 |
| ψo/ψD | 0.65 | Lo (mm) | 0.65 |
| FT (mm) | 0.92 | ψb (mm) | 2.7 |
| CT (mm) | 0.91 | ψo/ψb | 0.74 |
| FT/CT | 1.01 | f (mm) | 3.57 |
| ETmin (mm) | 0.1 | f/ψd | 2.26 |
| ETmin/CT | 0.11 | | |

It is worth to be mentioned that, in the 1st embodiment, ψd=ψY.

2nd Embodiment

Figure 2A:
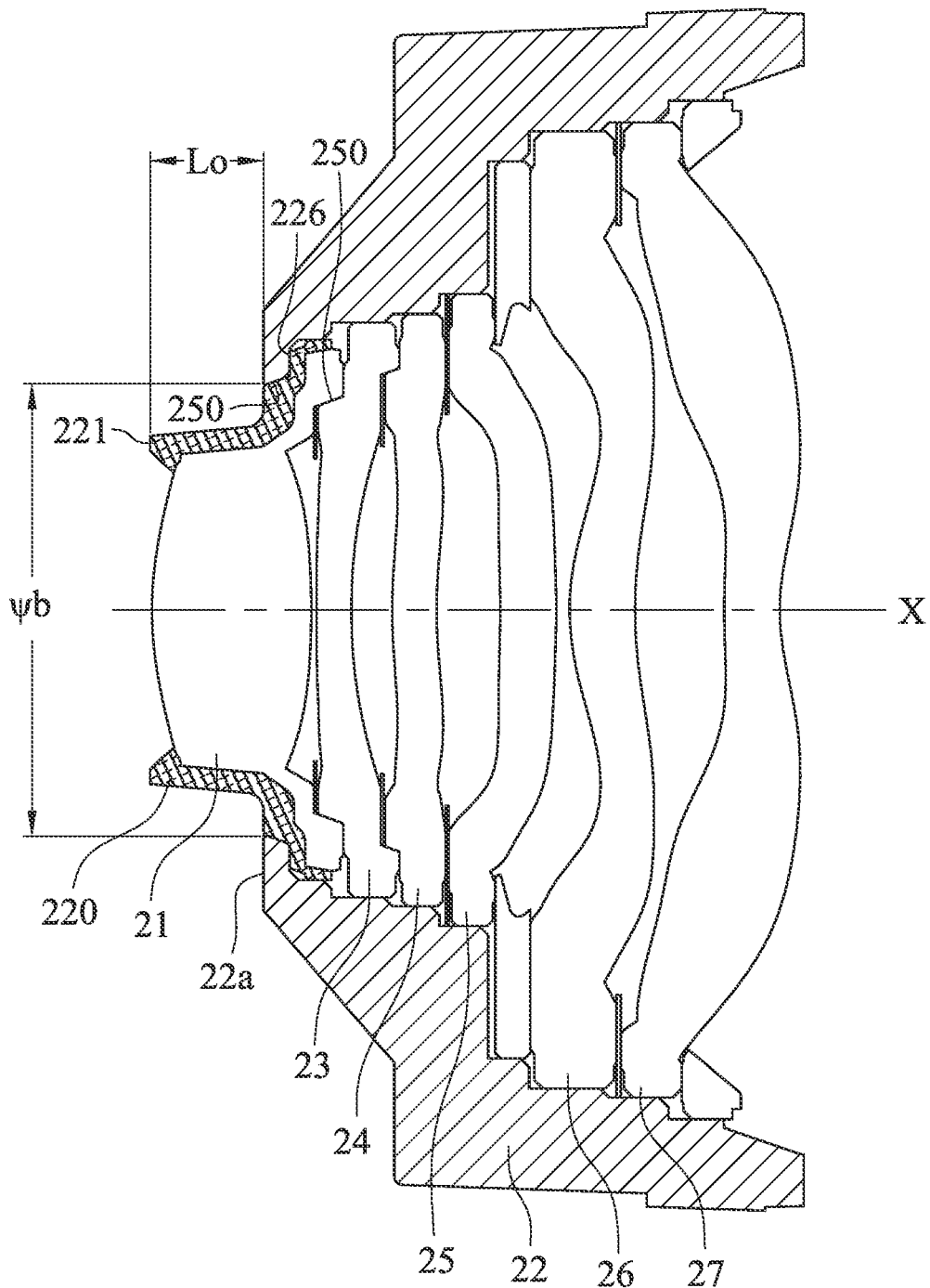
FIG. 2A is a schematic view of an imaging lens assembly module according to the 2nd embodiment of the present disclosure.

FIG. 2A is a schematic view of an imaging lens assembly module 20 according to the 2nd embodiment of the present disclosure. As shown in FIG. 2A, the imaging lens assembly module 20 includes an imaging lens element assembly (its reference numeral is omitted) and a plastic barrel 22. The imaging lens element assembly includes a dual molded lens element 21. The plastic barrel 22 contains the imaging lens element assembly. The plastic barrel 22 includes a top surface 22a, and the top surface 22a faces towards an object side of the imaging lens assembly module 20.

In detail, the imaging lens element assembly further includes an image lens element. The image lens element is disposed on an image side of the dual molded lens element 21. In the 2nd embodiment, the imaging lens element assembly, in order from the object side to the image side, includes the dual molded lens element 21, image lens elements 23, 24, 25, 26 and 27, wherein the dual molded lens element 21 is disposed on the most object side of the imaging lens element assembly. Further, the optical characteristics of the image lens element, such as number, structure and surface shape, can be configured according to different imaging requirements, other optical elements can be disposed according to requirements and will not be limited thereto.

Figure 2B:
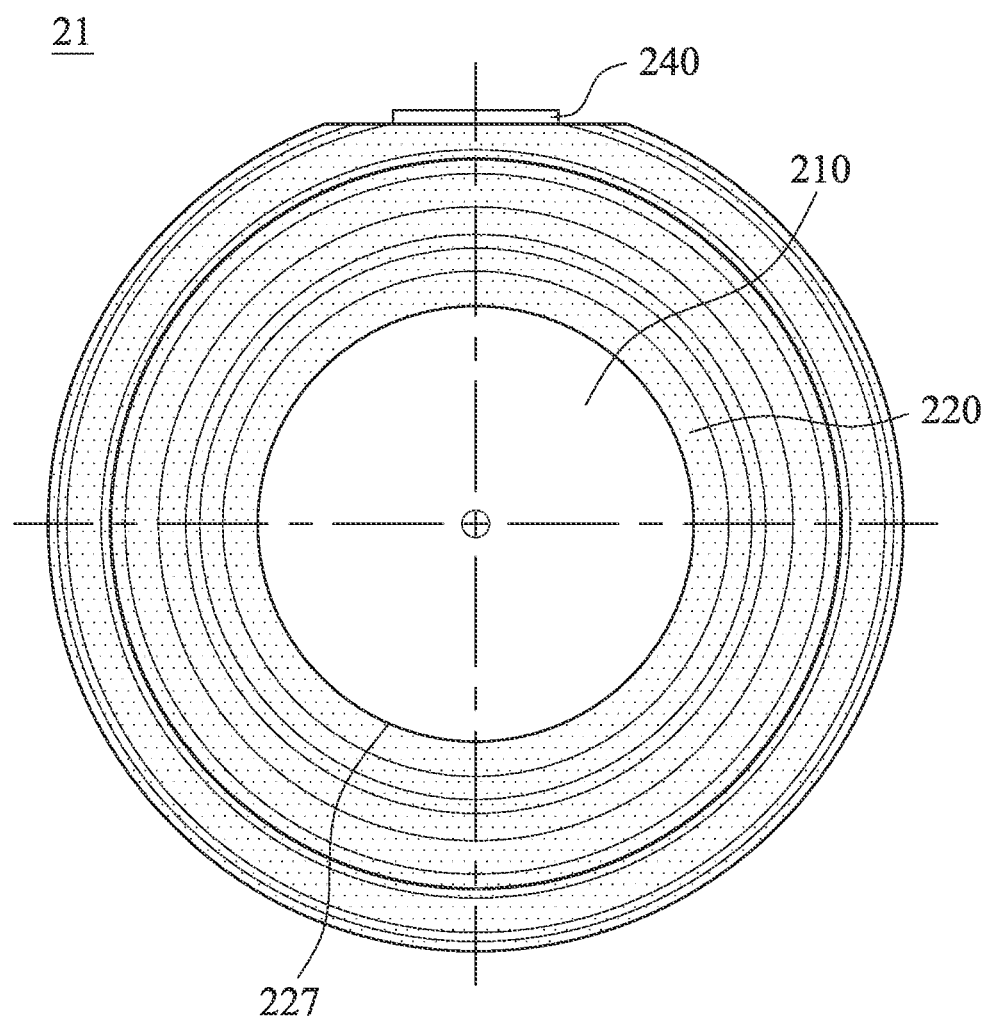
FIG. 2B is a schematic view of an object side of a dual molded lens element according to the 2nd embodiment of FIG. 2A.
Figure 2C:
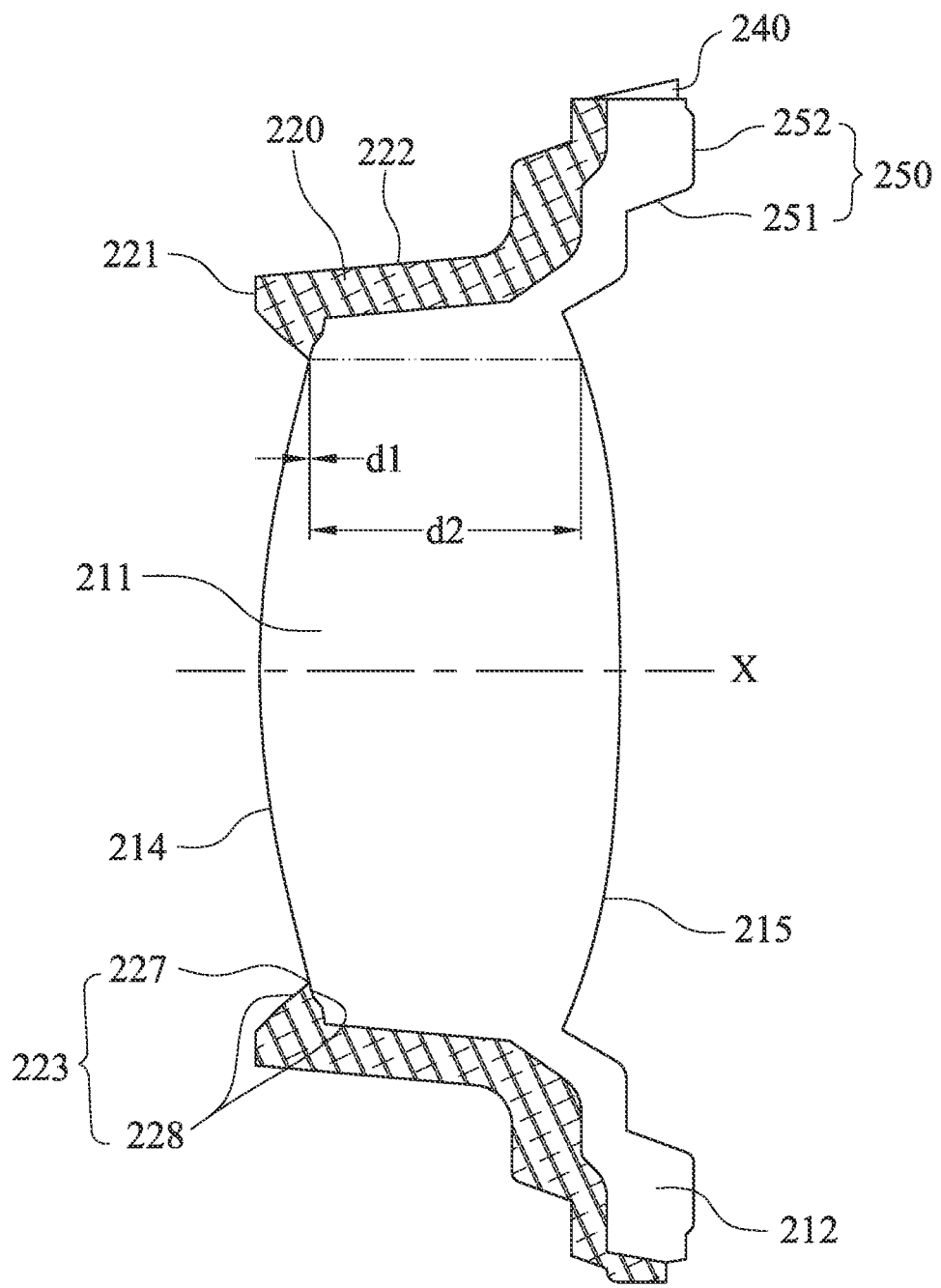
FIG. 2C is a schematic view of parameters of the dual molded lens element according to the 2nd embodiment of FIG. 2A.
Figure 2D:
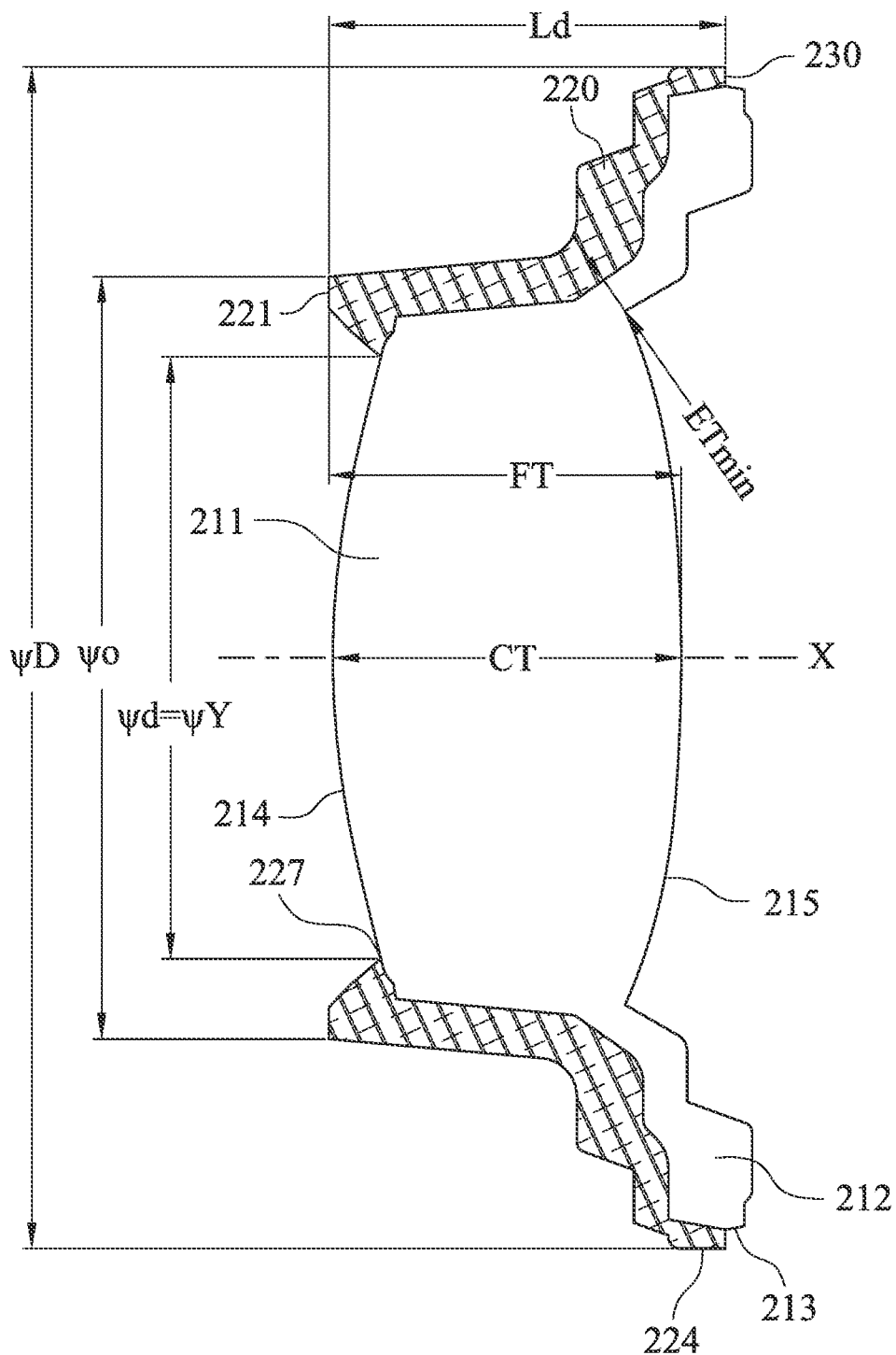
FIG. 2D is another schematic view of parameters of the dual molded lens element according to the 2nd embodiment of FIG. 2A.

FIG. 2B is a schematic view of an object side of a dual molded lens element 21 according to the 2nd embodiment of FIG. 2A. FIG. 2C is a schematic view of parameters of the dual molded lens element 21 according to the 2nd embodiment of FIG. 2A. FIG. 2D is another schematic view of parameters of the dual molded lens element 21 according to the 2nd embodiment of FIG. 2A. As shown in FIGS. 2B to 2D, the dual molded lens element 21 includes a transparent portion 210, a light absorbing portion 220 and a step structure 230.

Specifically, the dual molded lens element 21 can be made integrally by dual-shot injection molding. The transparent portion 210 is formed by a first injection molding, then the light absorbing portion 220 is formed by a second injection molding, and the light absorbing portion 220 is tightly connected to the transparent peripheral area 212 of the transparent portion 210 during molding, but the molding sequence will not be limited thereto. The transparent portion 210 can be a transparent plastic material, and the light absorbing portion 220 can be a black plastic material, wherein the light absorbing portion 220 can absorb the non-imaging light. Therefore, the present disclosure provides the dual molded lens element 21 with small head structure to provide the feasibility of compactness of the imaging lens assembly module 20.

The transparent portion 210, in order from a center to a peripheral region, includes an optical effective area 211 and the transparent peripheral area 212, wherein an optical axis X of the imaging lens element assembly passes through the optical effective area 211, and the transparent peripheral area 212 surrounds the optical effective area 211. In detail, an imaging light (not shown) of the imaging lens element assembly passes through the optical effective area 211.

The light absorbing portion 220 surrounds the optical effective area 211 and is disposed on an object side of the transparent peripheral area 212. The light absorbing portion 220 includes an object-end surface 221, an outer inclined surface 222 and a minimum opening 223. The object-end surface 221 faces towards the object side, and the outer inclined surface 222 extends from the object-end surface 221 to an image side of the light absorbing portion 220 and is gradually far away from the optical axis X. Therefore, the object-end surface 221 and the outer inclined surface 222 can replace the peripheral light-shielding function of the plastic barrel 22, so that the structural complexity of the plastic barrel 22 can be simplified, and the collision and the interference between the dual molded lens element 21, the image lens elements 23, 24, 25, 26 and 27 and the plastic barrel 22 during assembling can also be prevented.

In detail, the object-end surface 221 is located at an object side of the top surface 22a, and the object-end surface 221 and the top surface 22a are substantially perpendicular to the optical axis X. The outer inclined surface 222 forms an included angle (its reference numeral is omitted) with the optical axis X. The included angle can be 1 degree to 40 degrees, so that a draft angle during molding can be provided, but the range of the included angle will not be limited thereto.

As shown in FIGS. 2C and 2D, the step structure 230 is connected to a first outer diameter surface 224 of the light absorbing portion 220 and a second outer diameter surface 213 of the transparent portion 210. Therefore, the mold design of injection molding can be simplified, and the stability of size accuracy can be improved. Specifically, due to different mold designs and different injection methods, the step structure 230 can be disposed on the light absorbing portion 220 or the transparent peripheral area 212. In the 2nd embodiment, the step structure 230 is located on the light absorbing portion 220.

As shown in FIGS. 2B and 2C, the dual molded lens element 21 can further include at least one trace structure. In the 2nd embodiment, the number of the trace structure 240 is one, but it will not be limited thereto. The trace structure 240 extends from the light absorbing portion 220 to the transparent peripheral area 212. Specifically, the surface property of the trace structure 240 is different from the surface property of the portion near the trace structure 240, and the trace structure 240 has no specific shape. In the 2nd embodiment, the trace structure 240 is rectangle, but it will not be limited thereto. Therefore, the molds in the dual-shot injection molding matching to each other can be provided, and the manufacturing process can be simplified and the productivity can be increased. In detail, the surface of the trace structure 240 can be a transparent plastic, a black plastic, a partially transparent plastic and a partially black plastic or a mixture of transparent plastic and black plastic, but the present disclosure will not be limited thereto.

The minimum opening 223 of the light absorbing portion 220 includes a tip minimum opening 227 and two shrinking surfaces 228. The tip minimum opening 227 and the optical effective area 211 are contacted with each other so as to form an aperture stop of the imaging lens assembly module, and the shrinking surfaces 228 shrink from the object side and the image side of the light absorbing portion 220 to the tip minimum opening 227, respectively.

Specifically, the tip minimum opening 227 is the aperture stop of the imaging lens assembly module 20, which can control the amount of the light entering the imaging lens assembly module 20, wherein the diameter of the tip minimum opening 227 is the diameter of the minimum opening 223 of the light absorbing portion 220. Therefore, the tip minimum opening 227 can replace the opening of the plastic barrel 22 for light shielding, so that the structure of the opening of the plastic barrel 22 can be simplified, and the manufacturing cost of the plastic barrel 22 can be reduced.

Further, the design of the aperture stop can be controlled by the precision of the mold, so that the aperture stop of the dual molded lens element 21 after molding can be directly disposed concentrically with the optical effective area 211. Therefore, it is favorable for directly avoiding the assembling tolerance by the arrangement described in the present disclosure, which is different from the traditional lens assembly having the light shielding element as the aperture stop.

In detail, as shown in FIG. 2A, the light absorbing portion 220 further includes an object-side bearing surface 226. The object-side bearing surface 226 faces towards the object side and is farther away from the optical axis X than the outer inclined surface 222 therefrom. The object-side bearing surface 226 is for assembling with the plastic barrel 22.

The optical effective area 211 includes an object-side surface 214 and an image-side surface 215. One of the object-side surface 214 and the image-side surface 215 is aspheric. In the 2nd embodiment, both of the object-side surface 214 and the image-side surface 215 are aspheric. Therefore, the high-precision light bending force can be provided, and the optical aberration can be reduced. In the 2nd embodiment, since the tip minimum opening 227 is contacted with the object-side surface 214 of the optical effective area 211, the range of the object-side surface 214 of the optical effective area 211 can be directly defined.

In detail, in the conventional optical design, the light-shielding position of the aperture stop is designed at the outside of the lens element and is kept a specific distance from the optical mirror. However, in the present disclosure, the tip minimum opening 227 can be attached to the object-side surface 214 of the transparent portion 210 or can be embedded in the transparent portion 210. In the 2nd embodiment, the tip minimum opening 227 is attached to the object-side surface 214 of the transparent portion 210, but it will not be limited thereto.

As shown in FIG. 2A, the dual molded lens element 21 further includes an axial connecting structure. The axial connecting structure is located at the transparent peripheral area 212 and corresponds to the image lens element 23. In the 2nd embodiment, the dual molded lens element 21 includes two axial connecting structures 250, and the axial connecting structures are located at the transparent peripheral area 212 and the light absorbing portion 220, respectively. The axial connecting structure 250 located at the transparent peripheral area 212 corresponds to the image lens element 23, and the axial connecting structure 250 located at the light absorbing portion 220 corresponds to the plastic barrel 22. Specifically, the dual molded lens element 21 is correspondingly connected to the image lens element 23 and the plastic barrel 22 through the axial connecting structures 250, respectively. In detail, the axial connecting structure 250 of the dual molded lens element 21 includes an annular plane 251 and an inclined-tapered surface 252. The annular plane 251 and the inclined-tapered surface 252 are for axially connecting to the image lens element 23, a center of the dual molded lens element 21 is aligned with a center of the image lens element 23 being adjacent thereto along the direction parallel to the optical axis X by the axial connecting structure 250 located at the transparent peripheral area 212, that is, the position of the centers are located on the optical axis X, and the axial connecting structure 250 located at the light absorbing portion 220 is for aligning the dual molded lens element 21 and the plastic barrel 22 along direction parallel to the optical axis X. Therefore, the concentricity between the dual molded lens element 21 and the image lens element 23 can be increased and the assembling efficiency can be enhanced.

As shown in FIGS. 2A, 2C and 2D, when a distance from the object-end surface 221 to the step structure 230 is Ld, a diameter of the first outer diameter surface 224 is $\psi$D, a diameter of the minimum opening 223 of the light absorbing portion 220 is $\psi$d, an outer diameter of the object-end surface 221 is $\psi$o, a central thickness of the optical effective area 211 is CT, a distance from an image-side center of the optical effective area 211 to the object-end surface 221 is FT, a minimum thickness of the transparent peripheral area 212 is ET min, an outer diameter of the object-side surface 214 is $\psi$Y, a distance from the tip minimum opening 227 along a direction parallel to the optical axis X towards the object side of the transparent portion 210 to the object-side surface 214 is d1, a distance from the tip minimum opening 227 along the direction parallel to the optical axis X towards the image side of the transparent portion 210 to the image-side surface 215 is d2, a distance from the object-end surface 221 to the top surface 22a is Lo, a diameter of a minimum opening of the plastic barrel 22 is ψb, and a focal length of the imaging lens element assembly is f, the conditions of the following table 2 can be satisfied.

TABLE 2

| 2nd embodiment | | | |
|---|---|---|---|
| Ld (mm) | 1.04 | ψY (mm) | 1.58 |
| ψD (mm) | 3.1 | ψd/ψY | 1 |
| ψd (mm) | 1.58 | d1 (mm) | 0 |
| Ld/((ψD − ψd)/2) | 1.37 | d2 (mm) | 0.69 |
| ψo (mm) | 2 | d1/(d1 + d2) | 0 |
| ψo/ψD | 0.65 | Lo (mm) | 0.65 |
| FT (mm) | 0.92 | ψb (mm) | 2.6 |
| CT (mm) | 0.91 | ψo/ψb | 0.77 |
| FT/CT | 1.01 | f (mm) | 3.57 |
| ETmin (mm) | 0.1 | f/ψd | 2.26 |
| ETmin/CT | 0.11 | | |

It is worth to be mentioned that, in the 2nd embodiment, ψd=ψY.

3rd Embodiment

Figure 3A:
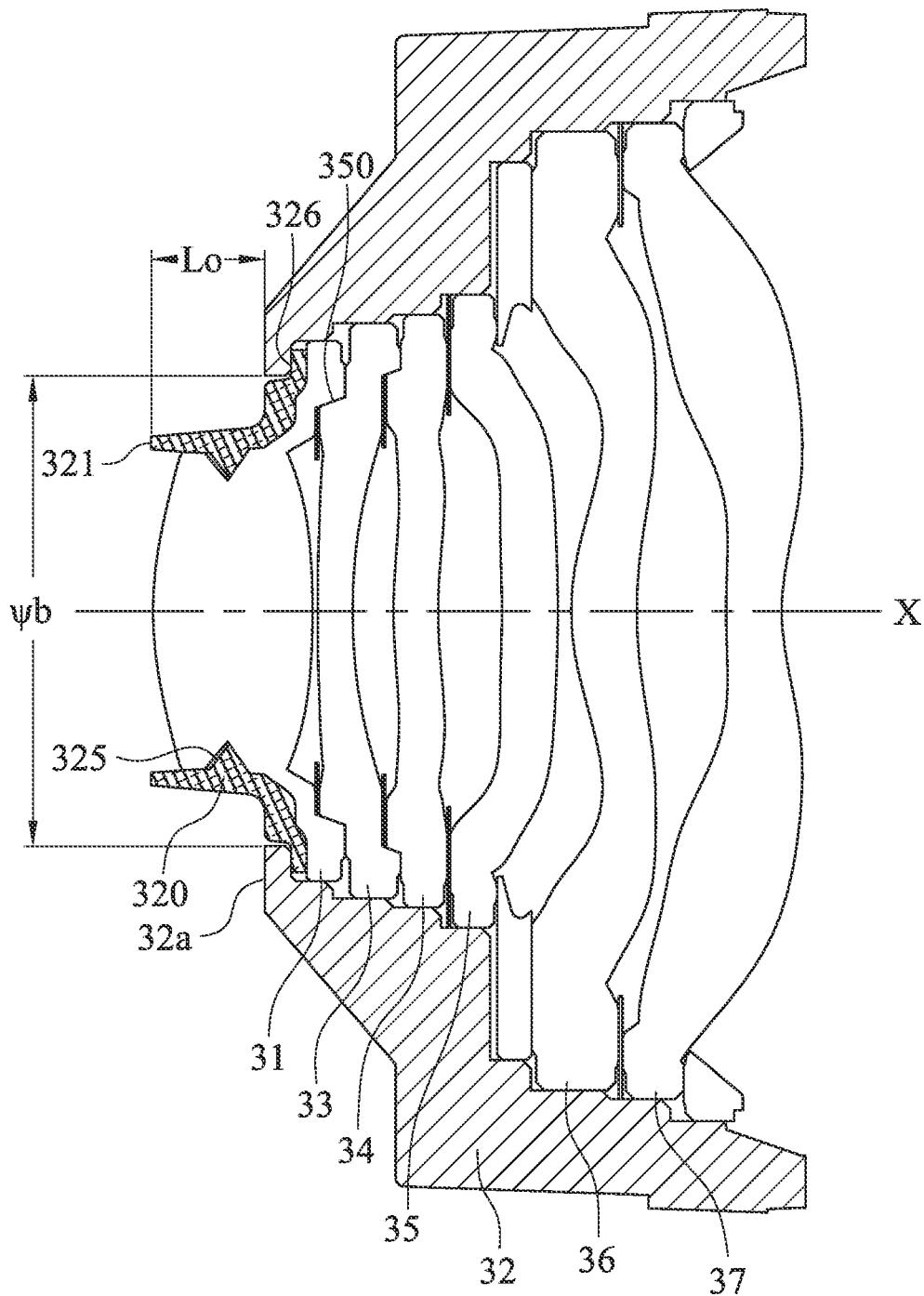
FIG. 3A is a schematic view of an imaging lens assembly module according to the 3rd embodiment of the present disclosure.

FIG. 3A is a schematic view of an imaging lens assembly module 30 according to the 3rd embodiment of the present disclosure. As shown in FIG. 3A, the imaging lens assembly module 30 includes the imaging lens element assembly (its reference numeral is omitted) and a plastic barrel 32. The imaging lens element assembly includes a dual molded lens element 31. The plastic barrel 32 contains the imaging lens element assembly. The plastic barrel 32 includes a top surface 32a, wherein the top surface 32a faces towards an object side of the imaging lens assembly module 30.

In detail, the imaging lens element assembly further includes an image lens element. The image lens element is disposed on an image side of the dual molded lens element 31. In the 3rd embodiment, the imaging lens element assembly, in order from the object side to the image side, includes the dual molded lens element 31, image lens elements 33, 34, 35, 36 and 37, wherein the dual molded lens element 31 is disposed on the most object side of the imaging lens element assembly. Further, the optical characteristics of the image lens element, such as number, structure and surface shape, can be configured according to different imaging requirements, other optical elements can be disposed according to requirements and will not be limited thereto.

Figure 3B:
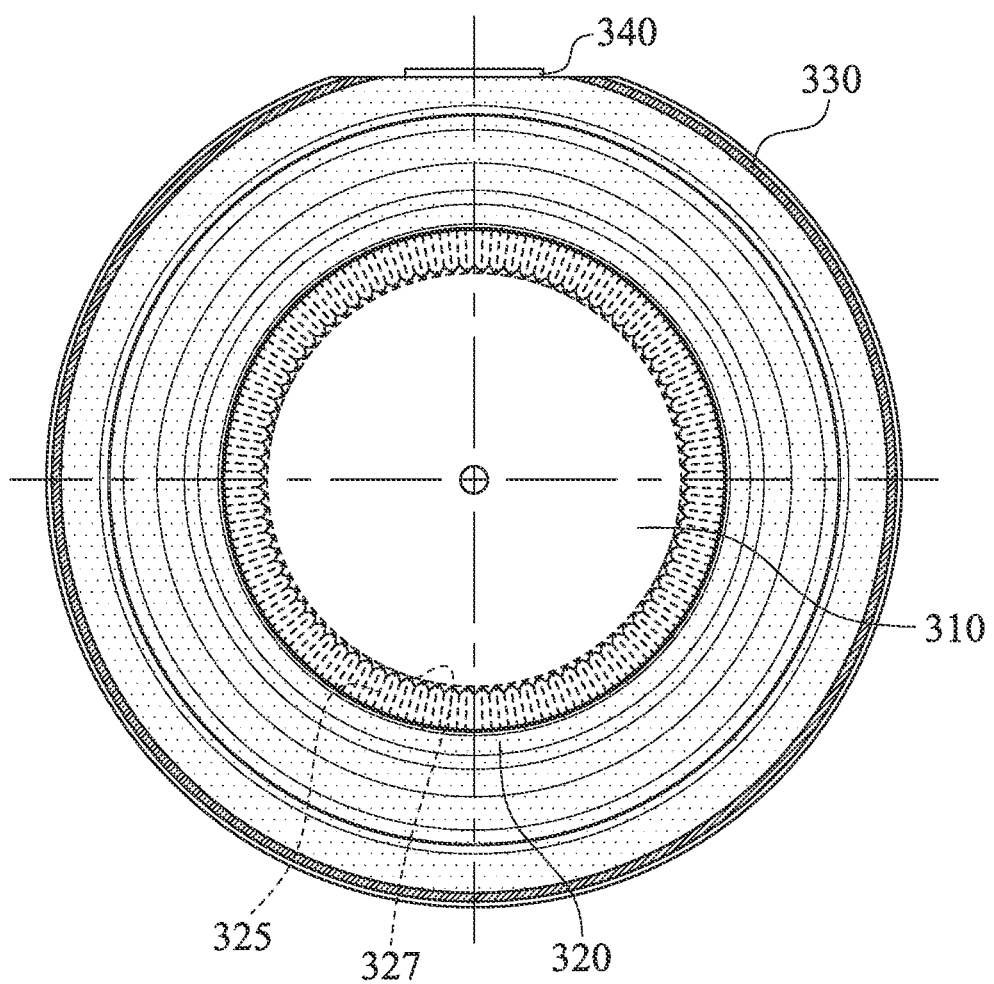
FIG. 3B is a schematic view of an object side of a dual molded lens element according to the 3rd embodiment of FIG. 3A.
Figure 3C:
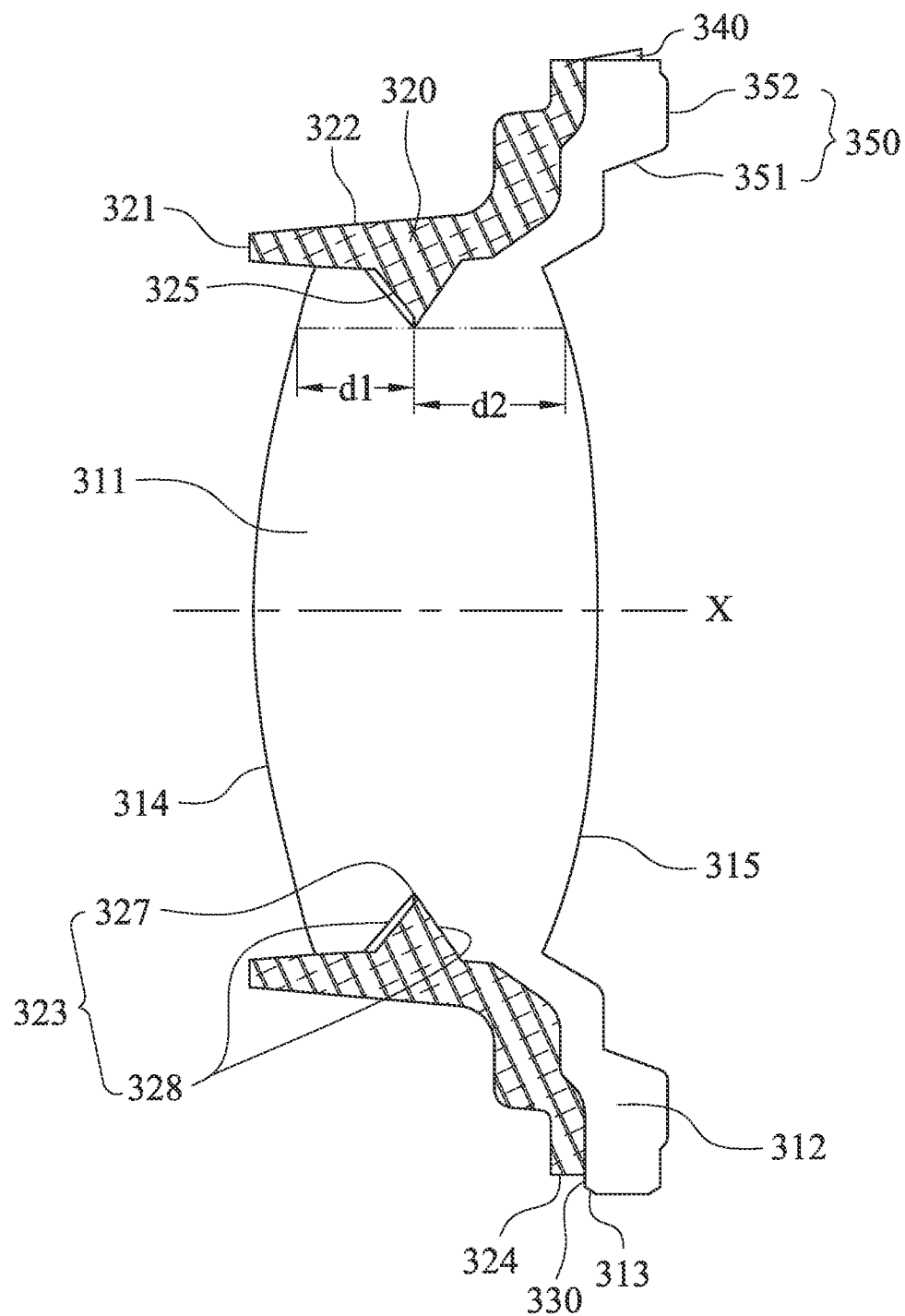
FIG. 3C is a schematic view of parameters of the dual molded lens element according to the 3rd embodiment of FIG. 3A.
Figure 3D:
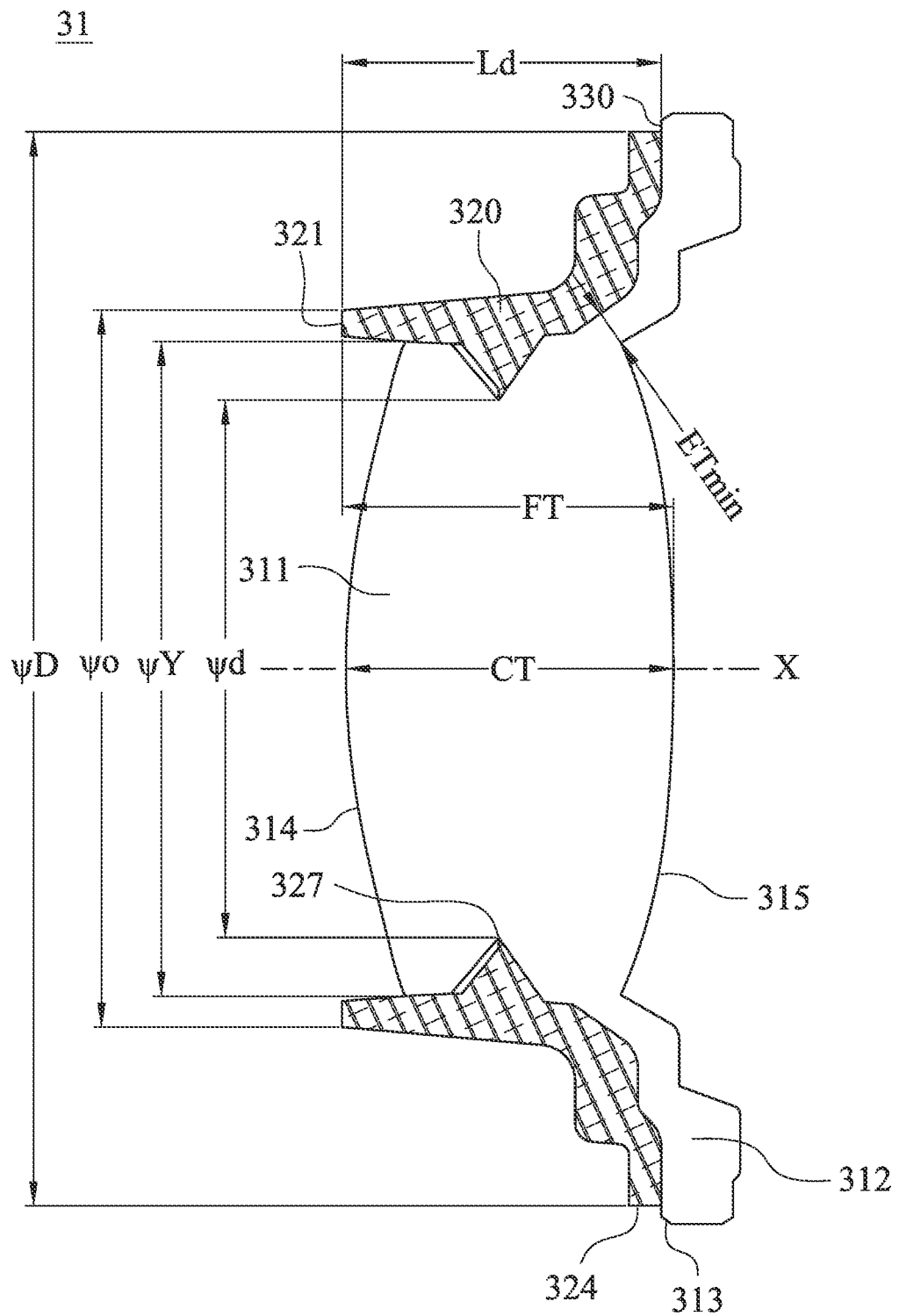
FIG. 3D is another schematic view of parameters of the dual molded lens element according to the 3rd embodiment of FIG. 3A.

FIG. 3B is a schematic view of the object side of a dual molded lens element 31 according to the 3rd embodiment of FIG. 3A. FIG. 3C is a schematic view of parameters of the dual molded lens element 31 according to the 3rd embodiment of FIG. 3A. FIG. 3D is another schematic view of parameters of the dual molded lens element 31 according to the 3rd embodiment of FIG. 3A. As shown in FIGS. 3B to 3D, the dual molded lens element 31 includes a transparent portion 310, a light absorbing portion 320 and a step structure 330.

Specifically, the dual molded lens element 31 can be made integrally by dual-shot injection molding. The transparent portion 310 is formed by a first injection molding, then the light absorbing portion 320 is formed by a second injection molding, and the light absorbing portion 320 is tightly connected to the transparent peripheral area 312 of the transparent portion 310 during molding, but the molding sequence will not be limited thereto. The transparent portion 310 can be a transparent plastic material, and the light absorbing portion 320 can be a black plastic material, wherein the light absorbing portion 320 can absorb the non-imaging light. Therefore, the present disclosure provides the dual molded lens element 31 with small head structure to provide the feasibility of compactness of the imaging lens assembly module 30.

The transparent portion 310, in order from a center to a peripheral region, includes an optical effective area 311 and the transparent peripheral area 312, wherein an optical axis X of the imaging lens element assembly passes through the optical effective area 311, and the transparent peripheral area 312 surrounds the optical effective area 311. In detail, an imaging light (not shown) of the imaging lens element assembly passes through the optical effective area 311.

The light absorbing portion 320 surrounds the optical effective area 311 and is disposed on an object side of the transparent peripheral area 312. The light absorbing portion 320 includes an object-end surface 321, an outer inclined surface 322 and a minimum opening 323. The object-end surface 321 faces towards the object side, and the outer inclined surface 322 extends from the object-end surface 321 to an image side of the light absorbing portion 320 and is gradually far away from the optical axis X. Therefore, the object-end surface 321 and the outer inclined surface 322 can replace the peripheral light-shielding function of the plastic barrel 32, so that the structural complexity of the plastic barrel 32 can be simplified, and the collision and the interference between the dual molded lens element 31, the image lens elements 33, 34, 35, 36 and 37 and the plastic barrel 32 during assembling can also be prevented.

In detail, the object-end surface 321 is located at an object side of the top surface 32a, and the object-end surface 321 and the top surface 32a are substantially perpendicular to the optical axis X. The outer inclined surface 322 forms an included angle (its reference numeral is omitted) with the optical axis X. The included angle can be 1 degree to 40 degrees, so that a draft angle during molding can be provided, but the range of the included angle will not be limited thereto.

As shown in FIGS. 3C and 3D, the step structure 330 is connected to a first outer diameter surface 324 of the light absorbing portion 320 and a second outer diameter surface 313 of the transparent portion 310. Therefore, the mold design of injection molding can be simplified, and the stability of size accuracy can be improved. Specifically, due to different mold designs and different injection methods, the step structure 330 can be disposed on the light absorbing portion 320 or the transparent peripheral area 312. In the 3rd embodiment, the step structure 330 is located on the transparent peripheral area 312.

As shown in FIGS. 3B and 3C, the dual molded lens element 31 can further include at least one trace structure. In the 3rd embodiment, the number of the trace structures 340 is one, but it will not be limited thereto. The trace structure 340 extends from the light absorbing portion 320 to the transparent peripheral area 312. Specifically, the surface property of the trace structure 340 is different from the surface property of the portion near the trace structure 340, and the trace structure 340 has no specific shape. In the 3rd embodiment, the trace structure 340 is rectangle, but it will not be limited thereto. Therefore, the molds in the dual-shot injection molding matching to each other can be provided, and the manufacturing process can be simplified and the productivity can be increased. In detail, the surface of the trace structure 340 can be a transparent plastic, a black plastic, a partially transparent plastic and a partially black plastic or a mixture of transparent plastic and black plastic, but the present disclosure will not be limited thereto.

The minimum opening 323 of the light absorbing portion 320 includes a tip minimum opening 327 and two shrinking surfaces 328. The tip minimum opening 327 and the optical effective area 311 are contacted with each other so as to form an aperture stop of the imaging lens assembly module, and the shrinking surfaces 328 shrink from the object side and the image side of the light absorbing portion 320 to the tip minimum opening 327, respectively.

Specifically, the tip minimum opening 327 is the aperture stop of the imaging lens assembly module 30, which can control the amount of the light entering the imaging lens assembly module 30, wherein the diameter of the tip minimum opening 327 is the diameter of the minimum opening 323 of the light absorbing portion 320. Therefore, the tip minimum opening 327 can replace the opening of the plastic barrel 32 for light shielding, so that the structure of the opening of the plastic barrel 32 can be simplified, and the manufacturing cost of the plastic barrel 32 can be reduced.

Further, the design of the aperture stop can be controlled by the precision of the mold, so that the aperture stop of the dual molded lens element 31 after molding can be directly disposed concentrically with the optical effective area 311. Therefore, it is favorable for directly avoiding the assembling tolerance by the arrangement described in the present disclosure, which is different from the traditional lens assembly having the light shielding element as the aperture stop.

As shown in FIGS. 3A to 3D, the light absorbing portion 320 includes at least one light diminishing structure. In the 3rd embodiment, the number of the light diminishing structure 325 is one. The light diminishing structure 325 is composed of a plurality of stripe-shaped grooves (not shown). The stripe-shaped grooves are arranged in at least one manner of being arranged in a circumferential direction and surrounding the optical axis X of the imaging lens element assembly as a center. Therefore, the ability of the light absorbing portion 320 to absorb the stray light can be enhanced, and the feasibility of molding can be maintained. In the 3rd embodiment, the light diminishing structure 325 of the light absorbing portion 320 is arranged in the circumferential direction, but it will not be limited thereto. Therefore, the plastic of the dual-shot injection molding can be joined more tightly.

The light diminishing structure 325 can be disposed on at least one of the two shrinking surfaces 328. Specifically, in the 3rd embodiment, the light diminishing structure 325 is disposed on the shrinking surface 328 of the object side of the tip minimum opening 327. In detail, the high-intensity stray light is easily generated around the tip minimum opening 327, so that the shrinking surfaces 328 need to have a higher efficiency of light absorbing ability. Therefore, the efficiency for eliminating the stray light around the tip minimum opening 327 can be improved by disposing the light diminishing structure 325 on the shrinking surfaces 328.

In detail, as shown in FIG. 3A, the light absorbing portion 320 further includes an object-side bearing surface 326. The object-side bearing surface 326 faces towards the object side and is farther away from the optical axis X than the outer inclined surface 322 therefrom. The object-side bearing surface 326 is for assembling with the plastic barrel 32.

The optical effective area 311 includes an object-side surface 314 and an image-side surface 315. One of the object-side surface 314 and the image-side surface 315 is aspheric. In the 3rd embodiment, both of the object-side surface 314 and the image-side surface 315 are aspheric. Therefore, the high-precision light bending force can be provided, and the optical aberration can be reduced.

In detail, in the conventional optical design, the light-shielding position of the aperture stop is designed at the outside of the lens element and is kept a specific distance from the optical mirror. However, in the present disclosure, the tip minimum opening 327 can be attached to the object-side surface 314 of the transparent portion 310 or can be embedded in the transparent portion 310. In the 3rd embodiment, the tip minimum opening 327 is embedded in the transparent portion 310, but it will not be limited thereto.

As shown in FIG. 3A, the dual molded lens element 31 further includes an axial connecting structure 350. The axial connecting structure 350 is located at the transparent peripheral area 312 and corresponds to the image lens element 33. Specifically, the dual molded lens element 31 is correspondingly connected to the image lens element 33 through the axial connecting structure 350. In detail, the axial connecting structure 350 includes an annular plane 351 and an inclined-tapered surface 352. The annular plane 351 and the inclined-tapered surface 352 are for axially connecting to the image lens element 33. In detail, a center of the dual molded lens element 31 is aligned with a center of the image lens element 33 being adjacent thereto along the direction parallel to the optical axis X by the axial connecting structure 350, that is, the position of the centers are located on the optical axis X. Therefore, the concentricity between the dual molded lens element 31 and the image lens element 33 can be increased and the assembling efficiency can be enhanced.

As shown in FIGS. 3A, 3C and 3D, when a distance from the object-end surface 321 to the step structure 330 is Ld, a diameter of the first outer diameter surface 324 is ψD, a diameter of the minimum opening 323 of the light absorbing portion 320 is ψd, an outer diameter of the object-end surface 321 is ψo, a central thickness of the optical effective area 311 is CT, a distance from an image-side center of the optical effective area 311 to the object-end surface 321 is FT, a minimum thickness of the transparent peripheral area 312 is ETmin, an outer diameter of the object-side surface 314 is ψY, a distance from the tip minimum opening 327 along a direction parallel to the optical axis X towards the object side of the transparent portion 310 to the object-side surface 314 is d1, a distance from the tip minimum opening 327 along the direction parallel to the optical axis X towards the image side of the transparent portion 310 to the image-side surface 315 is d2, a distance from the object-end surface 321 to the top surface 32a is Lo, a diameter of a minimum opening of the plastic barrel 32 is ψb, and a focal length of the imaging lens element assembly is f, the conditions of the following table 3 can be satisfied.

TABLE 3

| 3rd embodiment | | | |
|---|---|---|---|
| Ld (mm) | 0.89 | ψY (mm) | 1.83 |
| ψD (mm) | 3 | ψd/ψY | 0.82 |
| ψd (mm) | 1.5 | d1 (mm) | 0.31 |
| Ld/((ψD − ψd)/2) | 1.19 | d2 (mm) | 0.4 |
| ψo (mm) | 2 | d1/(d1 + d2) | 0.44 |
| ψo/ψD | 0.67 | Lo (mm) | 0.65 |
| FT (mm) | 0.92 | ψb (mm) | 2.7 |
| CT (mm) | 0.91 | ψo/ψb | 0.74 |
| FT/CT | 1.01 | f (mm) | 3.57 |
| ETmin (mm) | 0.1 | f/ψd | 2.38 |
| ETmin/CT | 0.11 | | |

4th Embodiment

Figure 4A:
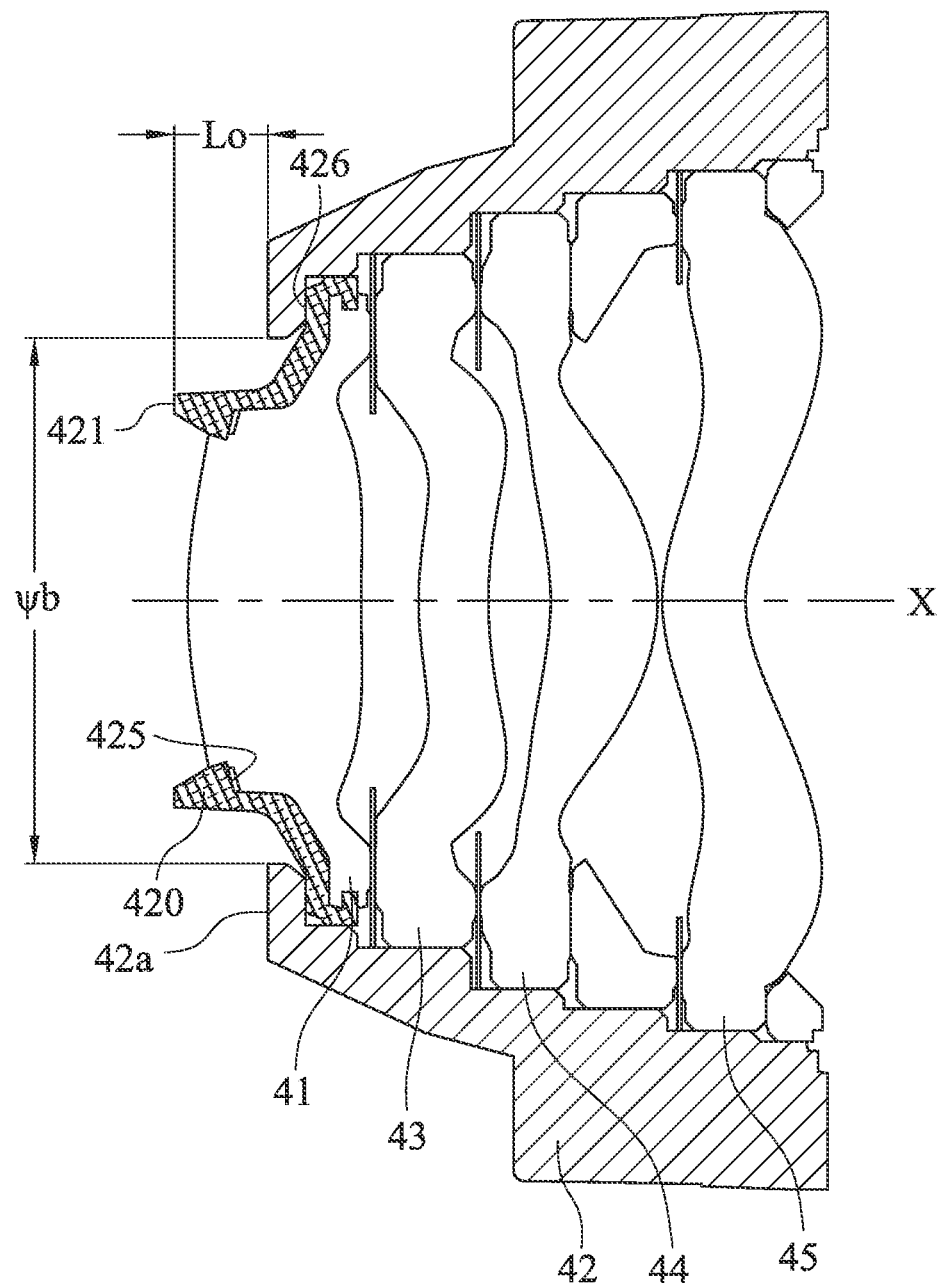
FIG. 4A is a schematic view of an imaging lens assembly module according to the 4th embodiment of the present disclosure.

FIG. 4A is a three-dimensional view of an imaging lens assembly module 40 according to the 4th embodiment of the present disclosure. As shown in FIG. 4A, the imaging lens assembly module 40 includes the imaging lens element assembly (its reference numeral is omitted) and a plastic barrel 42. The imaging lens element assembly includes a dual molded lens element 41. The plastic barrel 42 contains the imaging lens element assembly. The plastic barrel 42 includes a top surface 42a, wherein the top surface 42a faces towards an object side of the imaging lens assembly module 40.

In detail, the imaging lens element assembly further includes an image lens element. The image lens element is disposed on an image side of the dual molded lens element 41. In the 4th embodiment, the imaging lens element assembly, in order from the object side to the image side, includes the dual molded lens element 41, image lens elements 43, 44 and 45, wherein the dual molded lens element 41 is disposed on the most object side of the imaging lens element assembly. Further, the optical characteristics of the image lens element, such as number, structure and surface shape, can be configured according to different imaging requirements, other optical elements can be disposed according to requirements and will not be limited thereto.

Figure 4B:
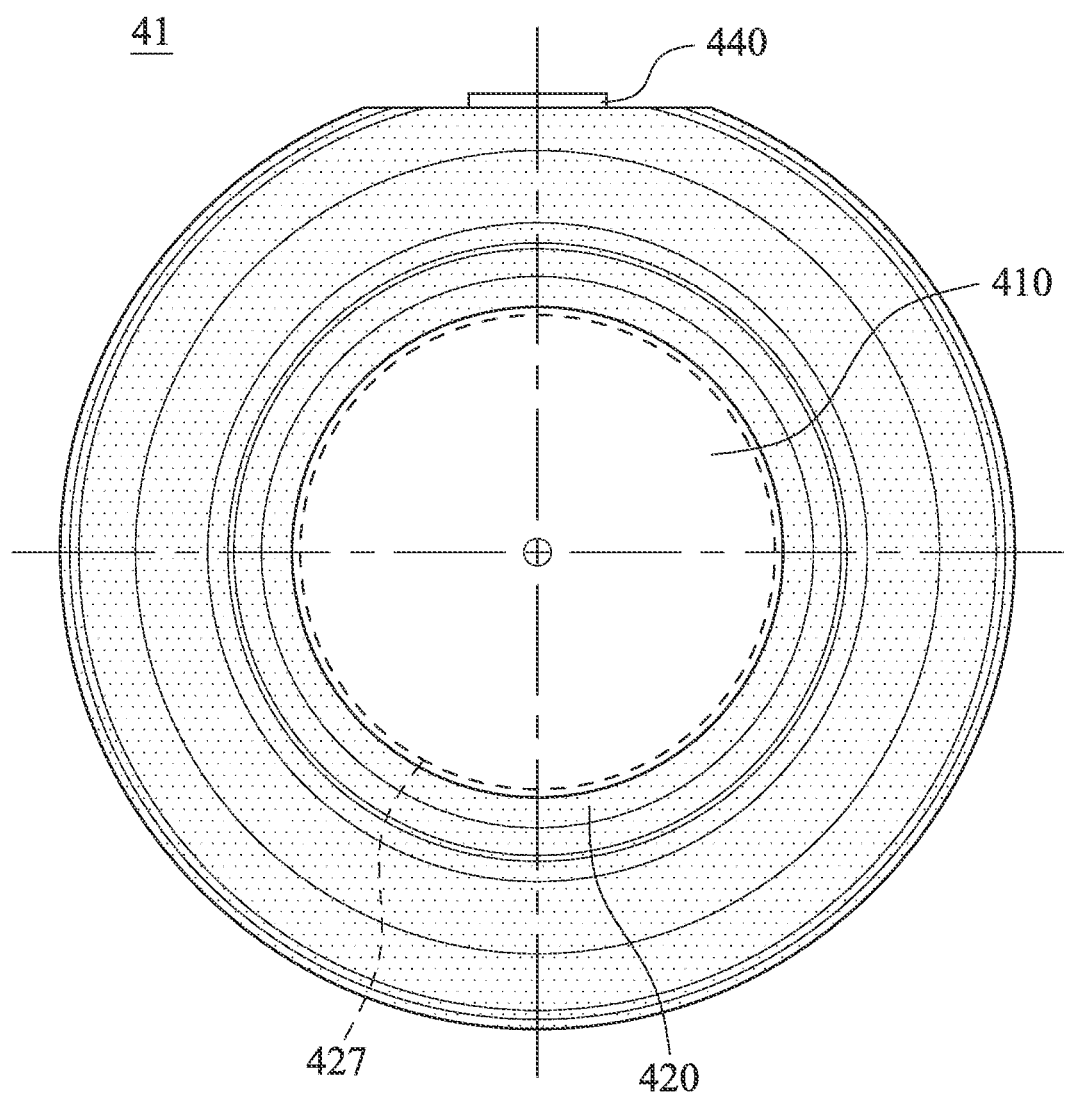
FIG. 4B is a schematic view of an object side of a dual molded lens element according to the 4th embodiment of FIG. 4A.
Figure 4C:
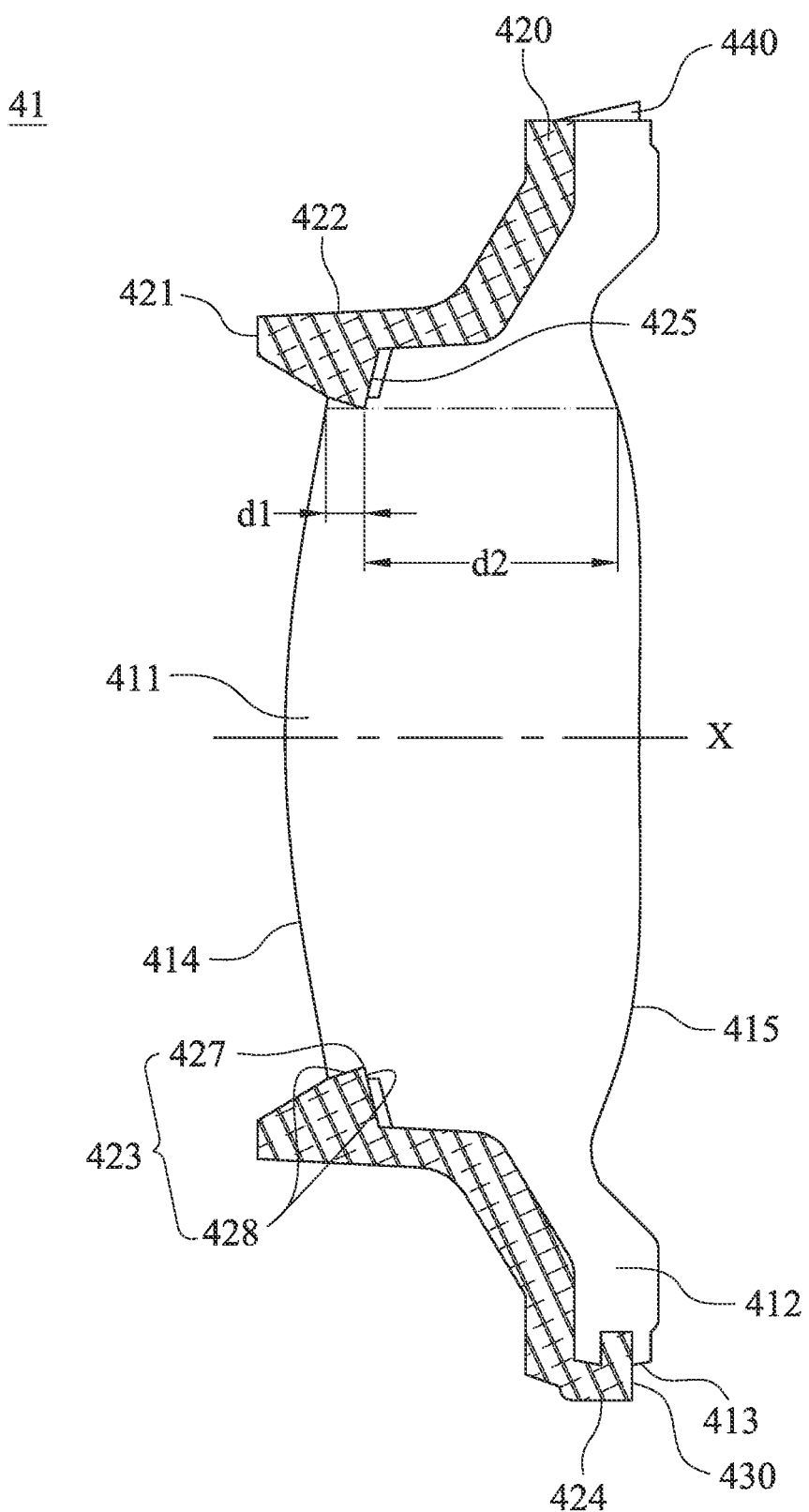
FIG. 4C is a schematic view of parameters of the dual molded lens element according to the 4th embodiment of FIG. 4A.
Figure 4D:
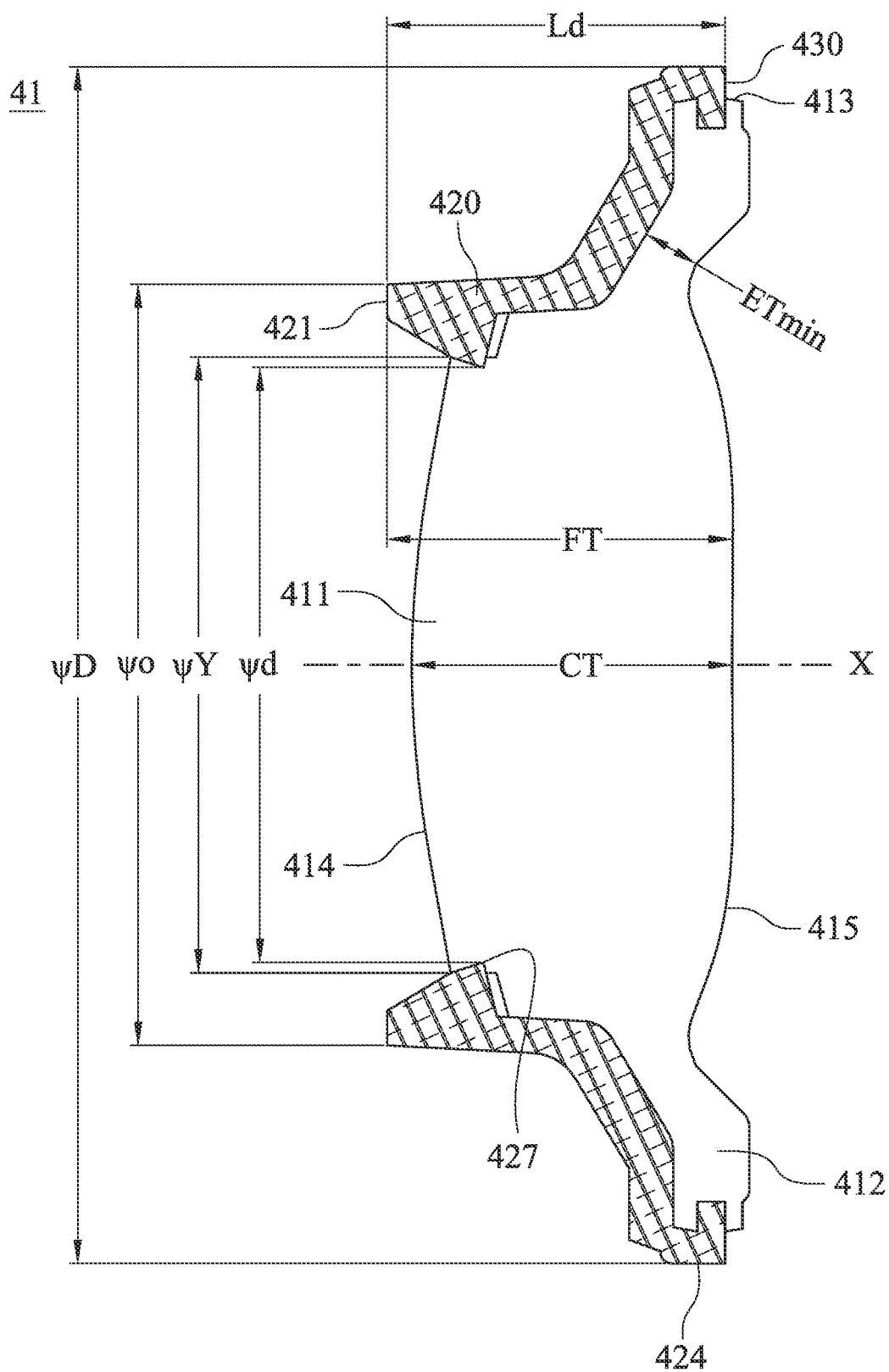
FIG. 4D is another schematic view of parameters of the dual molded lens element according to the 4th embodiment of FIG. 4A.

FIG. 4B is a schematic view of the object side of a dual molded lens element 41 according to the 4th embodiment of FIG. 4A. FIG. 4C is a schematic view of parameters of the dual molded lens element according to the 4th embodiment of FIG. 4A. FIG. 4D is another schematic view of parameters of the dual molded lens element according to the 4th embodiment of FIG. 4A. As shown in FIGS. 4B to 4D, the dual molded lens element 41 includes a transparent portion 410, a light absorbing portion 420 and a step structure 430.

Specifically, the dual molded lens element 41 can be made integrally by dual-shot injection molding. The transparent portion 410 is formed by a first injection molding, then the light absorbing portion 420 is formed by a second injection molding, and the light absorbing portion 420 is tightly connected to the transparent peripheral area 412 of the transparent portion 410 during molding, but the molding sequence will not be limited thereto. The transparent portion 410 can be a transparent plastic material, and the light absorbing portion 420 can be a black plastic material, wherein the light absorbing portion 420 can absorb the non-imaging light. Therefore, the present disclosure provides the dual molded lens element 41 with small head structure to provide the feasibility of compactness of the imaging lens assembly module 40.

The transparent portion 410, in order from a center to a peripheral region, includes an optical effective area 411 and the transparent peripheral area 412, wherein an optical axis X of the imaging lens element assembly passes through the optical effective area 411, and the transparent peripheral area 412 surrounds the optical effective area 411. In detail, an imaging light (not shown) of the imaging lens element assembly passes through the optical effective area 411.

The light absorbing portion 420 surrounds the optical effective area 411 and is disposed on an object side of the transparent peripheral area 412. The light absorbing portion 420 includes an object-end surface 421, an outer inclined surface 422 and a minimum opening 423. The object-end surface 421 faces towards the object side, and the outer inclined surface 422 extends from the object-end surface 421 to an image side of the light absorbing portion 420 and is gradually far away from the optical axis X. Therefore, the object-end surface 421 and the outer inclined surface 422 can replace the peripheral light-shielding function of the plastic barrel 42, so that the structural complexity of the plastic barrel 42 can be simplified, and the collision and the interference between the dual molded lens element 41, the image lens elements 43, 44 and 45 and the plastic barrel 42 during assembling can also be prevented.

In detail, the object-end surface 421 is located at an object side of the top surface 42a, and the object-end surface 421 and the top surface 42a are substantially perpendicular to the optical axis X. The outer inclined surface 422 forms an included angle (its reference numeral is omitted) with the optical axis X. The included angle can be 1 degree to 40 degrees, so that a draft angle during molding can be provided, but the range of the included angle will not be limited thereto.

As shown in FIGS. 4C and 4D, the step structure 430 is connected to a first outer diameter surface 424 of the light absorbing portion 420 and a second outer diameter surface 413 of the transparent portion 410. Therefore, the mold design of injection molding can be simplified, and the stability of size accuracy can be improved. Specifically, due to different mold designs and different injection methods, the step structure 430 can be disposed on the light absorbing portion 420 or the transparent peripheral area 412. In the 4th embodiment, the step structure 430 is located on the light absorbing portion 420.

As shown in FIGS. 4B and 4C, the dual molded lens element 41 can further include at least one trace structure. In the 4th embodiment, the number of the trace structure 440 is one, but it will not be limited thereto. The trace structure 440 extends from the light absorbing portion 420 to the transparent peripheral area 412. Specifically, the surface property of the trace structure 440 is different from the surface property of the portion near the trace structure 440, and the trace structure 440 has no specific shape. In the 4th embodiment, the trace structure 440 is rectangle, but it will not be limited thereto. Therefore, the molds in the dual-shot injection molding matching to each other can be provided, and the manufacturing process can be simplified and the productivity can be increased. In detail, the surface of the trace structure 440 can be a transparent plastic, a black plastic, a partially transparent plastic and a partially black plastic or a mixture of transparent plastic and black plastic, but the present disclosure will not be limited thereto.

The minimum opening 423 of the light absorbing portion 420 includes a tip minimum opening 427 and two shrinking surfaces 428. The tip minimum opening 427 and the optical effective area 411 are contacted with each other so as to form an aperture stop of the imaging lens assembly module, and the shrinking surfaces 428 shrink from the object side and the image side of the light absorbing portion 420 to the tip minimum opening 427, respectively.

Specifically, the tip minimum opening 427 is the aperture stop of the imaging lens assembly module 40, which can control the amount of the light entering the imaging lens assembly module 40, wherein the diameter of the tip minimum opening 427 is the diameter of the minimum opening 423 of the light absorbing portion 420. Therefore, the tip minimum opening 427 can replace the opening of the plastic barrel 42 for light shielding, so that the structure of the opening of the plastic barrel 42 can be simplified, and the manufacturing cost of the plastic barrel 42 can be reduced.

Further, the design of the aperture stop can be controlled by the precision of the mold, so that the aperture stop of the dual molded lens element 41 after molding can be directly disposed concentrically with the optical effective area 411.

Therefore, it is favorable for directly avoiding the assembling tolerance by the arrangement described in the present disclosure, which is different from the traditional lens assembly having the light shielding element as the aperture stop.

As shown in FIGS. 4A to 4D, the light absorbing portion 420 includes at least one light diminishing structure. In the 4th embodiment, the number of the light diminishing structure 425 is one. The light diminishing structure 425 is composed of a plurality of stripe-shaped grooves (not shown). The stripe-shaped grooves are arranged in at least one manner of being arranged in a circumferential direction and surrounding the optical axis X of the imaging lens element assembly as a center. Therefore, the ability of the light absorbing portion 420 to absorb the stray light can be enhanced, and the feasibility of molding can be maintained. In the 4th embodiment, the stripe-shaped grooves of the light diminishing structure 425 of the light absorbing portion 420 are arranged in the circumferential direction, but it will not be limited thereto. Therefore, the plastic of the dual-shot injection molding can be joined more tightly.

In the 4th embodiment, the light absorbing portion 420 can have barb structure. Therefore, the plastic of dual-shot injection molding can be joined more tightly.

The light diminishing structure 425 can be disposed on at least one of the two shrinking surfaces 428. Specifically, in the 4th embodiment, the light diminishing structure 425 is disposed on the shrinking surface 428 of the object side of the tip minimum opening 427. In detail, the high-intensity stray light is easily generated around the tip minimum opening 427, so that the shrinking surfaces 428 need to have a higher efficiency of light absorbing ability. Therefore, the efficiency for eliminating the stray light around the tip minimum opening 427 can be improved by disposing the light diminishing structure 425 on the shrinking surfaces 428.

In detail, as shown in FIG. 4A, the light absorbing portion 420 further includes an object-side bearing surface 426. The object-side bearing surface 426 faces towards the object side and is farther away from the optical axis X than the outer inclined surface 422 therefrom. The object-side bearing surface 426 is for assembling with the plastic barrel 42.

The optical effective area 411 includes an object-side surface 414 and an image-side surface 415. One of the object-side surface 414 and the image-side surface 415 is aspheric. In the 4th embodiment, both of the object-side surface 414 and the image-side surface 415 are aspheric. Therefore, the high-precision light bending force can be provided, and the optical aberration can be reduced.

In detail, in the conventional optical design, the light-shielding position of the aperture stop is designed at the outside of the lens element and is kept a specific distance from the optical mirror. However, in the present disclosure, the tip minimum opening 427 can be attached to the object-side surface 414 of the transparent portion 410 or can be embedded in the transparent portion 410. In the 4th embodiment, the tip minimum opening 427 is embedded in the transparent portion 410, but it will not be limited thereto.

As shown in FIGS. 4A, 4C and 4D, when a distance from the object-end surface 421 to the step structure 430 is Ld, a diameter of the first outer diameter surface 424 is ψD, a diameter of the minimum opening 423 of the light absorbing portion 420 is ψd, an outer diameter of the object-end surface 421 is ψo, a central thickness of the optical effective area 411 is CT, a distance from an image-side center of the optical effective area 411 to the object-end surface 421 is FT, a minimum thickness of the transparent peripheral area 412 is ET min, an outer diameter of the object-side surface 414 is ψY, a distance from the tip minimum opening 427 along a direction parallel to the optical axis X towards the object side of the transparent portion 410 to the object-side surface 414 is d1, a distance from the tip minimum opening 427 along the direction parallel to the optical axis X towards the image side of the transparent portion 410 to the image-side surface 415 is d2, a distance from the object-end surface 421 to the top surface 42a is Lo, a diameter of a minimum opening of the plastic barrel 42 is ψb, and a focal length of the imaging lens element assembly is f, the conditions of the following table 4 can be satisfied.

TABLE 4

| 4th embodiment | | | |
|---|---|---|---|
| Ld (mm) | 0.98 | ψY (mm) | 1.78 |
| ψD (mm) | 3.46 | ψd/ψY | 0.97 |
| ψd (mm) | 1.72 | d1 (mm) | 0.1 |
| Ld/((ψD − ψd)/2) | 1.13 | d2 (mm) | 0.66 |
| ψo (mm) | 2.2 | d1/(d1 + d2) | 0.13 |
| ψo/ψD | 0.64 | Lo (mm) | 0.5 |
| FT (mm) | 1 | ψb (mm) | 2.8 |
| CT (mm) | 0.93 | ψo/ψb | 0.79 |
| FT/CT | 1.08 | f (mm) | 2.5 |
| ETmin (mm) | 0.17 | f/ψd | 1.45 |
| ETmin/CT | 0.18 | | |

5th Embodiment

Figure 5A:
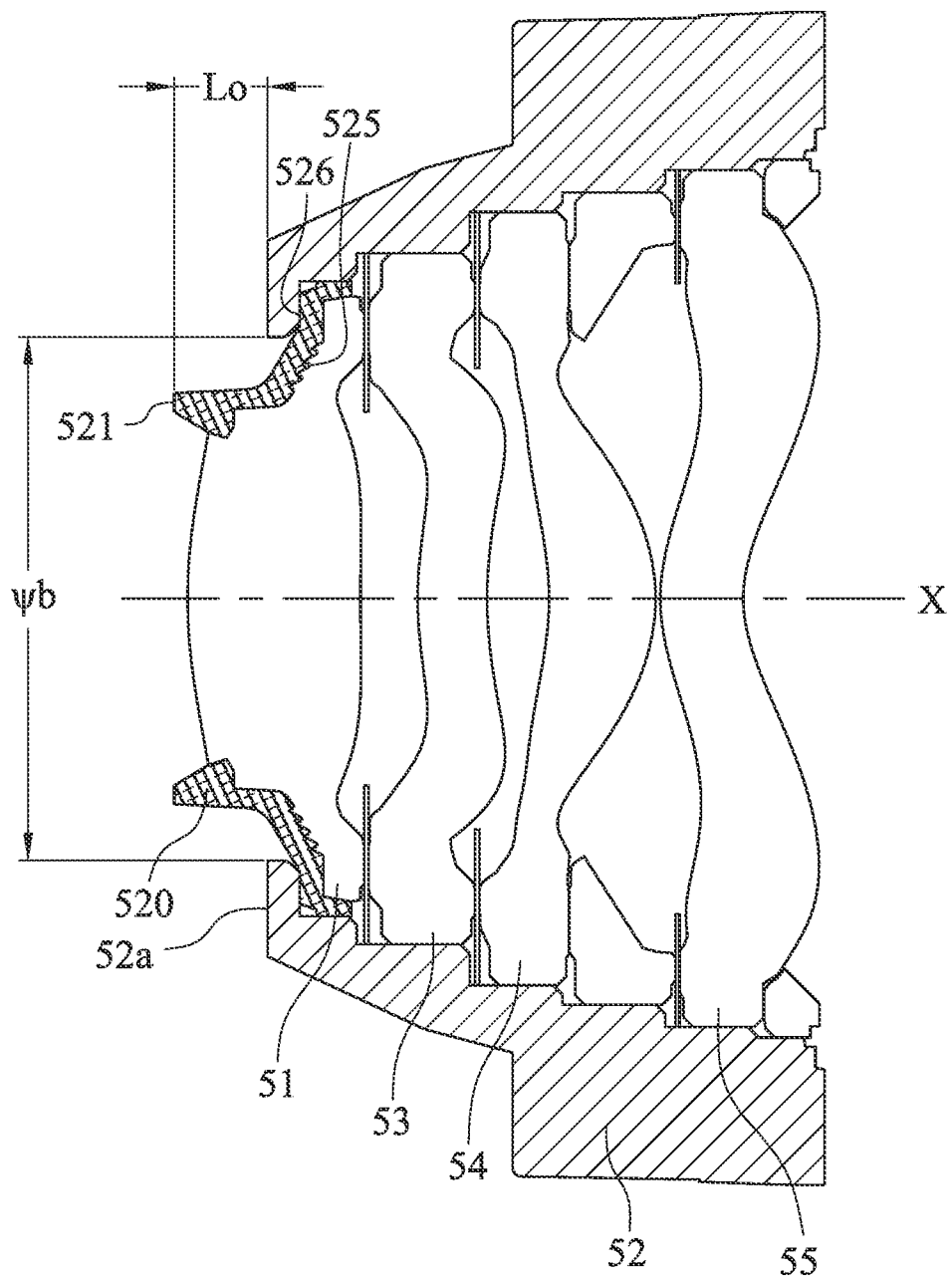
FIG. 5A is a schematic view of an imaging lens assembly module according to the 5th embodiment of the present disclosure.

FIG. 5A is a schematic view of an imaging lens assembly module 50 according to the 5th embodiment of the present disclosure. As shown in FIG. 5A, the imaging lens assembly module 50 includes an imaging lens element assembly (its reference numeral is omitted) and a plastic barrel 52. The imaging lens element assembly includes a dual molded lens element 51. The plastic barrel 52 contains the imaging lens element assembly. The plastic barrel 52 includes a top surface 52a, and the top surface 52a faces towards an object side of the imaging lens assembly module 50.

In detail, the imaging lens element assembly further includes an image lens element. The image lens element is disposed on an image side of the dual molded lens element 51. In the 5th embodiment, the imaging lens element assembly, in order from the object side to the image side, includes the dual molded lens element 51, image lens elements 53, 54 and 55, wherein the dual molded lens element 51 is disposed on the most object side of the imaging lens element assembly. Further, the optical characteristics of the image lens element, such as number, structure and surface shape, can be configured according to different imaging requirements, other optical elements can be disposed according to requirements and will not be limited thereto.

Figure 5B:
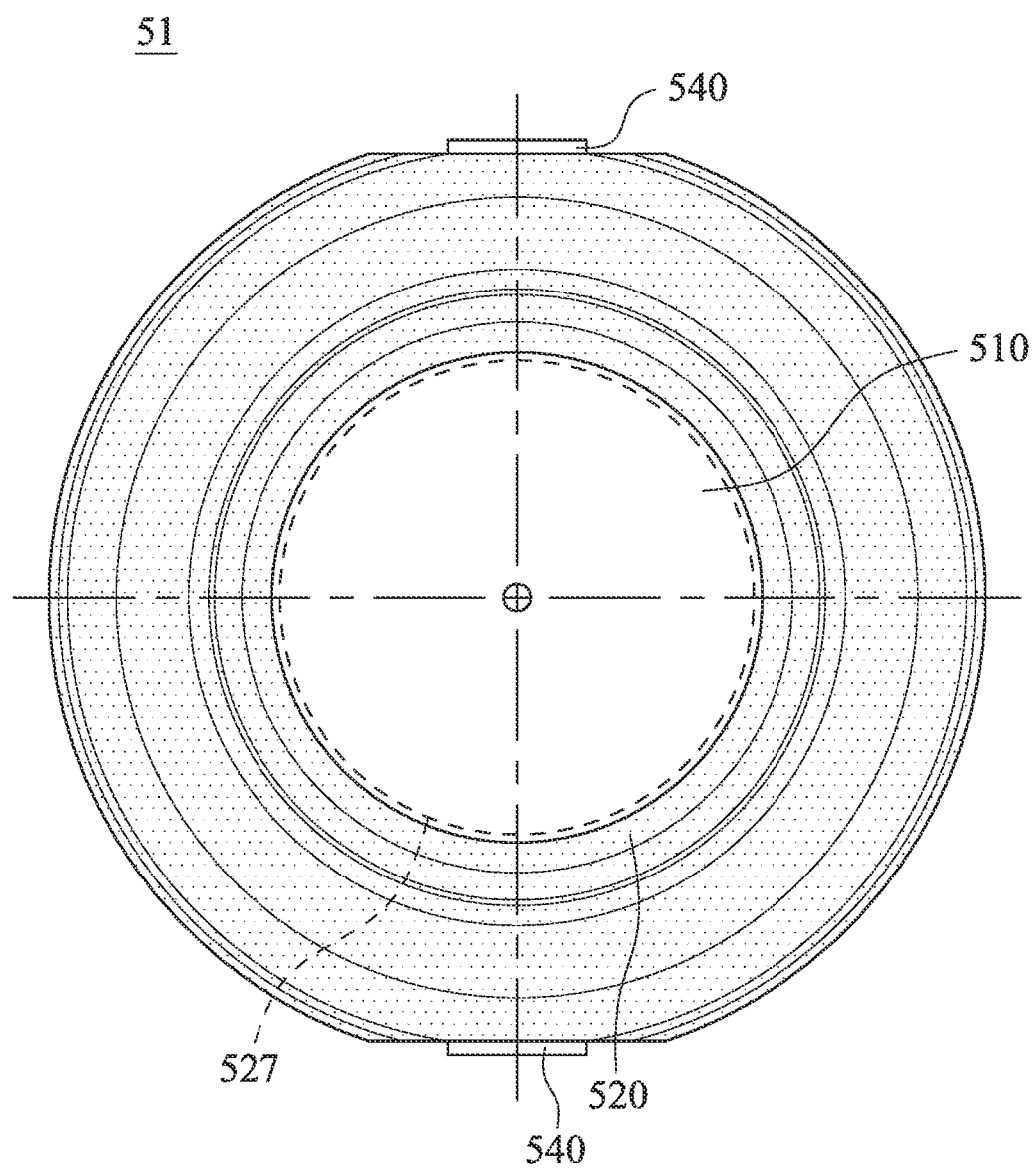
FIG. 5B is a schematic view of an object side of a dual molded lens element according to the 5th embodiment of FIG. 5A.
Figure 5C:
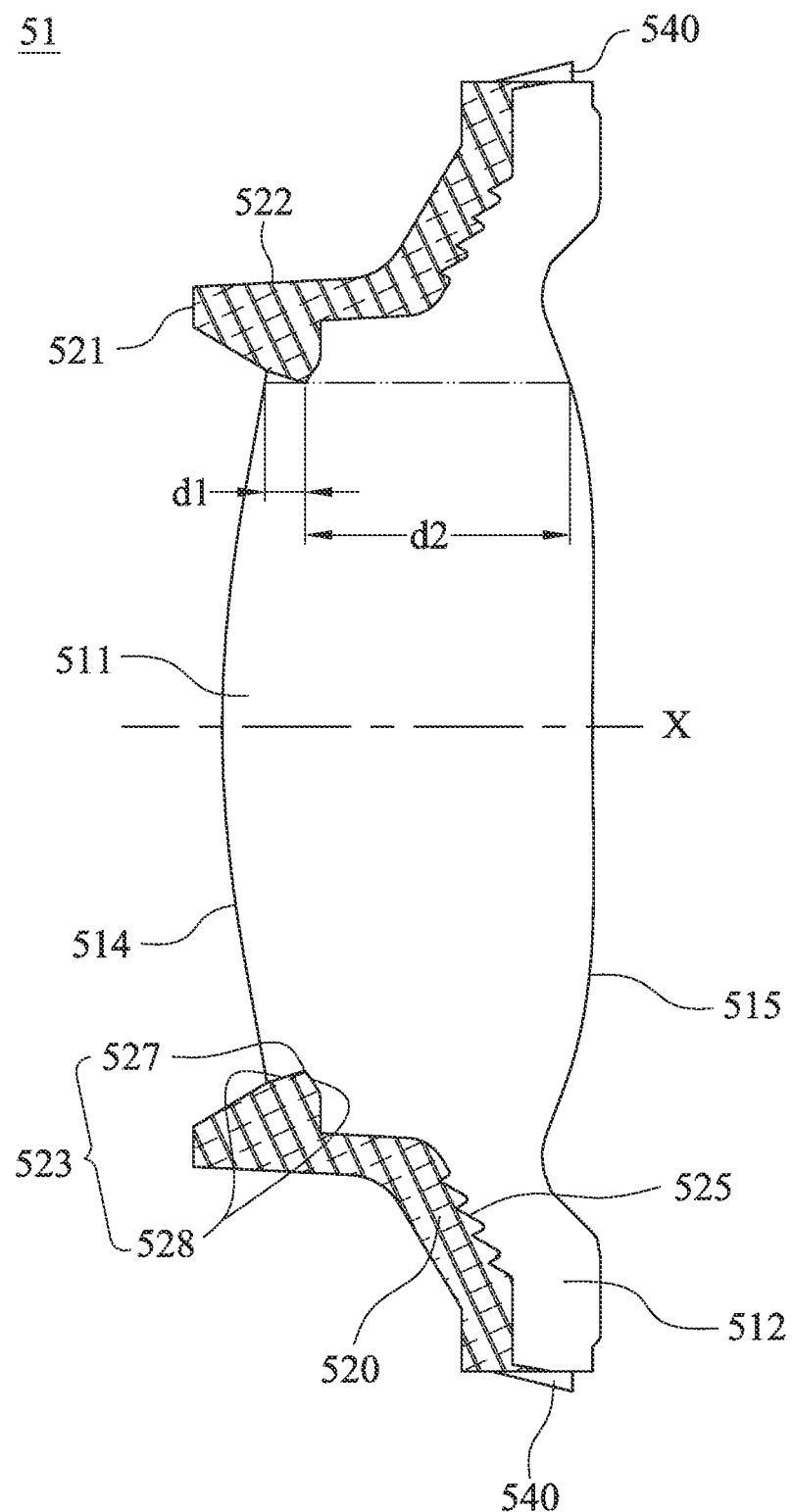
FIG. 5C is a schematic view of parameters of the dual molded lens element according to the 5th embodiment of FIG. 5A.
Figure 5D:
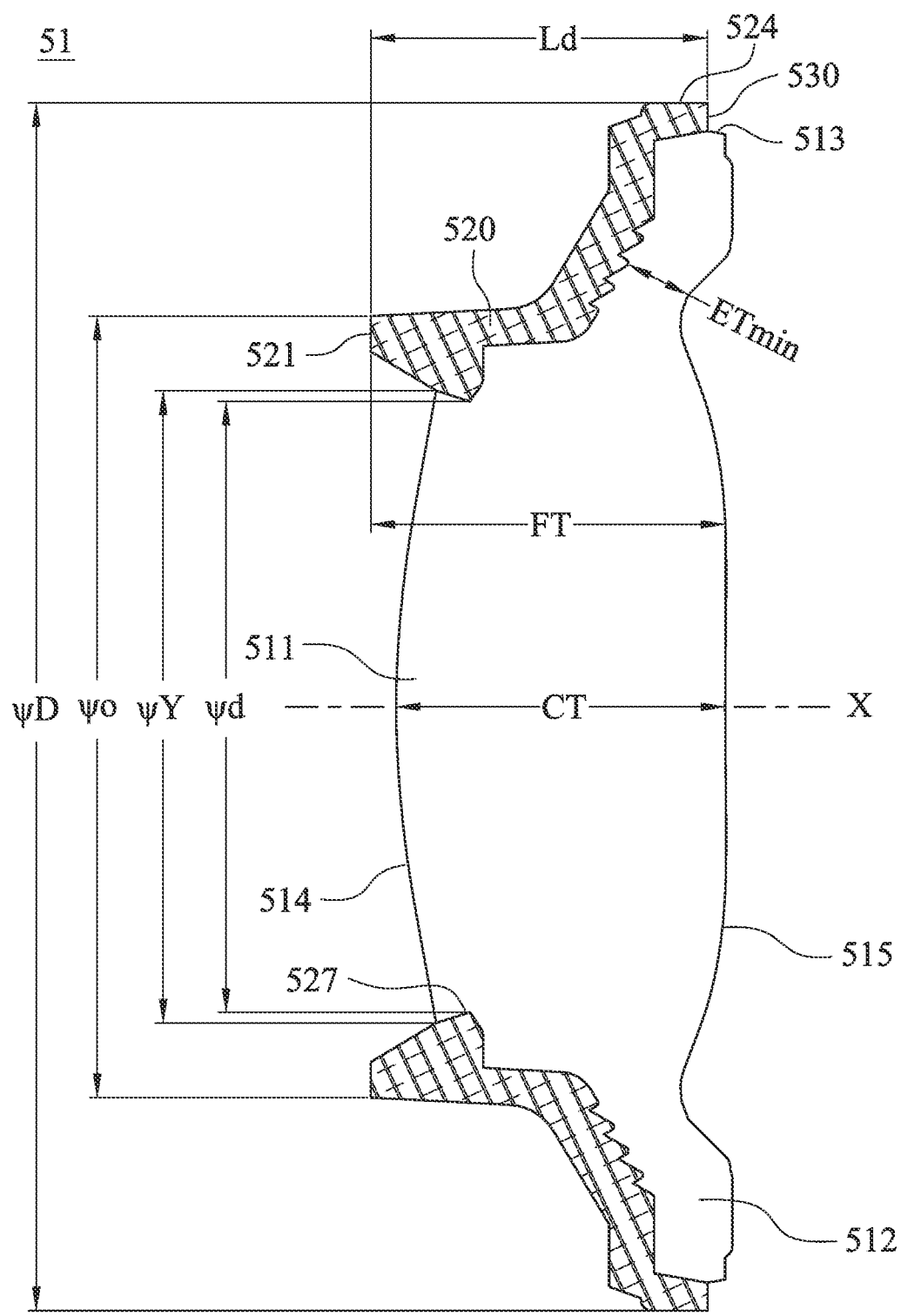
FIG. 5D is another schematic view of parameters of the dual molded lens element according to the 5th embodiment of FIG. 5A.

FIG. 5B is a schematic view of an object side of a dual molded lens element 51 according to the 5th embodiment of FIG. 5A. FIG. 5C is a schematic view of parameters of the dual molded lens element 51 according to the 5th embodiment of FIG. 5A. FIG. 5D is another schematic view of parameters of the dual molded lens element 51 according to the 5th embodiment of FIG. 5A. As shown in FIGS. 5B to 5D, the dual molded lens element 51 includes a transparent portion 510, a light absorbing portion 520 and a step structure 530.

Specifically, the dual molded lens element 51 can be made integrally by dual-shot injection molding. The transparent portion 510 is formed by a first injection molding, then the light absorbing portion 520 is formed by a second injection molding, and the light absorbing portion 520 is tightly connected to the transparent peripheral area 512 of the transparent portion 510 during molding, but the molding sequence will not be limited thereto. The transparent portion 510 can be a transparent plastic material, and the light absorbing portion 520 can be a black plastic material, wherein the light absorbing portion 520 can absorb the non-imaging light. Therefore, the present disclosure provides the dual molded lens element 51 with small head structure to provide the feasibility of compactness of the imaging lens assembly module 50.

The transparent portion 510, in order from a center to a peripheral region, includes an optical effective area 511 and the transparent peripheral area 512, wherein an optical axis X of the imaging lens element assembly passes through the optical effective area 511, and the transparent peripheral area 512 surrounds the optical effective area 511. In detail, an imaging light (not shown) of the imaging lens element assembly passes through the optical effective area 511.

The light absorbing portion 520 surrounds the optical effective area 511 and is disposed on an object side of the transparent peripheral area 512. The light absorbing portion 520 includes an object-end surface 521, an outer inclined surface 522 and a minimum opening 523. The object-end surface 521 faces towards the object side, and the outer inclined surface 522 extends from the object-end surface 521 to an image side of the light absorbing portion 520 and is gradually far away from the optical axis X. Therefore, the object-end surface 521 and the outer inclined surface 522 can replace the peripheral light-shielding function of the plastic barrel 52, so that the structural complexity of the plastic barrel 52 can be simplified, and the collision and the interference between the dual molded lens element 51, the image lens elements 53, 54 and 55 and the plastic barrel 52 during assembling can also be prevented.

In detail, the object-end surface 521 is located at an object side of the top surface 52a, and the object-end surface 521 and the top surface 52a are substantially perpendicular to the optical axis X. The outer inclined surface 522 forms an included angle (its reference numeral is omitted) with the optical axis X. The included angle can be 1 degree to 40 degrees, so that a draft angle during molding can be provided, but the range of the included angle will not be limited thereto.

As shown in FIGS. 5C and 5D, the step structure 530 is connected to a first outer diameter surface 524 of the light absorbing portion 520 and a second outer diameter surface 513 of the transparent portion 510. Therefore, the mold design of injection molding can be simplified, and the stability of size accuracy can be improved. Specifically, due to different mold designs and different injection methods, the step structure 530 can be disposed on the light absorbing portion 520 or the transparent peripheral area 512. In the 5th embodiment, the step structure 530 is located on the light absorbing portion 520.

As shown in FIGS. 5B and 5C, the dual molded lens element 51 can further include at least one trace structure. In the 5th embodiment, the number of the trace structures 540 is two, but it will not be limited thereto. The trace structures 540 extend from the light absorbing portion 520 to the transparent peripheral area 512. Specifically, the surface properties of the trace structures 540 are different from the surface property of the portion near the trace structures 540, and the trace structures 540 have no specific shape. In the 5th embodiment, the trace structures 540 are rectangle, but it will not be limited thereto. Therefore, the molds in the dual-shot injection molding matching to each other can be provided, and the manufacturing process can be simplified and the productivity can be increased. In detail, the surfaces of the trace structures 540 can be a transparent plastic, a black plastic, a partially transparent plastic and a partially black plastic or a mixture of transparent plastic and black plastic, but the present disclosure will not be limited thereto.

The minimum opening 523 of the light absorbing portion 520 includes a tip minimum opening 527 and two shrinking surfaces 528. The tip minimum opening 527 and the optical effective area 511 are contacted with each other so as to form an aperture stop of the imaging lens assembly module, and the shrinking surfaces 528 shrink from the object side and the image side of the light absorbing portion 520 to the tip minimum opening 527, respectively.

Specifically, the tip minimum opening 527 is the aperture stop of the imaging lens assembly module 50, which can control the amount of the light entering the imaging lens assembly module 50, wherein the diameter of the tip minimum opening 527 is the diameter of the minimum opening 523 of the light absorbing portion 520. Therefore, the tip minimum opening 527 can replace the opening of the plastic barrel 52 for light shielding, so that the structure of the opening of the plastic barrel 52 can be simplified, and the manufacturing cost of the plastic barrel 52 can be reduced.

Further, the design of the aperture stop can be controlled by the precision of the mold, so that the aperture stop of the dual molded lens element 51 after molding can be directly disposed concentrically with the optical effective area 511. Therefore, it is favorable for directly avoiding the assembling tolerance by the arrangement described in the present disclosure, which is different from the traditional lens assembly having the light shielding element as the aperture stop.

As shown in FIGS. 5A to 5D, the light absorbing portion 520 includes at least one light diminishing structure. In the 5th embodiment, the number of the light diminishing structure 525 is one. The light diminishing structure 525 is composed of a plurality of stripe-shaped grooves (not shown). The stripe-shaped grooves are arranged in at least one manner of being arranged in a circumferential direction and surrounding the optical axis X of the imaging lens element assembly as a center. Therefore, the ability of the light absorbing portion 520 to absorb the stray light can be enhanced, and the feasibility of molding can be maintained. In the 5th embodiment, the light diminishing structure 525 of the light absorbing portion 520 surrounds the optical axis X of the imaging lens element assembly as a center, but it will not be limited thereto. Therefore, the plastic of the dual-shot injection molding can be joined more tightly.

In detail, as shown in FIG. 5A, the light absorbing portion 520 further includes an object-side bearing surface 526. The object-side bearing surface 526 faces towards the object side and is farther away from the optical axis X than the outer inclined surface 522 therefrom. The object-side bearing surface 526 is for assembling with the plastic barrel 52.

The optical effective area 511 includes an object-side surface 514 and an image-side surface 515. One of the object-side surface 514 and the image-side surface 515 is aspheric. In the 5th embodiment, both of the object-side surface 514 and the image-side surface 515 are aspheric. Therefore, the high-precision light bending force can be provided, and the optical aberration can be reduced.

In detail, in the conventional optical design, the light-shielding position of the aperture stop is designed at the outside of the lens element and is kept a specific distance from the optical mirror. However, in the present disclosure, the tip minimum opening 527 can be attached to the object-side surface 514 of the transparent portion 510 or can be embedded in the transparent portion 510. In the 5th embodiment, the tip minimum opening 527 is embedded in the transparent portion 510, but it will not be limited thereto.

As shown in FIGS. 5A, 5C and 5D, when a distance from the object-end surface 521 to the step structure 530 is Ld, a diameter of the first outer diameter surface 524 is ψD, a diameter of the minimum opening 523 of the light absorbing portion 520 is ψd, an outer diameter of the object-end surface 521 is ψo, a central thickness of the optical effective area 511 is CT, a distance from an image-side center of the optical effective area 511 to the object-end surface 521 is FT, a minimum thickness of the transparent peripheral area 512 is ET min, an outer diameter of the object-side surface 514 is ψY, a distance from the tip minimum opening 527 along a direction parallel to the optical axis X towards the object side of the transparent portion 510 to the object-side surface 514 is d1, a distance from the tip minimum opening 527 along the direction parallel to the optical axis X towards the image side of the transparent portion 510 to the image-side surface 515 is d2, a distance from the object-end surface 521 to the top surface 52a is Lo, a diameter of a minimum opening of the plastic barrel 52 is ψb, and a focal length of the imaging lens element assembly is f, the conditions of the following table 5 can be satisfied.

TABLE 5

| 5th embodiment | | | |
| --- | --- | --- | --- |
| Ld (mm) | 0.95 | ψY (mm) | 1.78 |
| ψD (mm) | 3.4 | ψd/ψY | 0.97 |
| ψd (mm) | 1.72 | d1 (mm) | 0.1 |
| Ld/((ψD − ψd)/2) | 1.13 | d2 (mm) | 0.66 |
| ψo (mm) | 2.2 | d1/(d1 + d2) | 0.13 |
| ψ/ψD | 0.65 | Lo (mm) | 0.5 |
| FT (mm) | 1 | ψb (mm) | 2.8 |
| CT (mm) | 0.93 | ψo/ψb | 0.79 |
| FT/CT | 1.08 | f (mm) | 2.5 |
| ETmin (mm) | 0.19 | f/ψd | 1.45 |
| ETmin/CT | 0.20 | | |

6th Embodiment

Figure 6A:
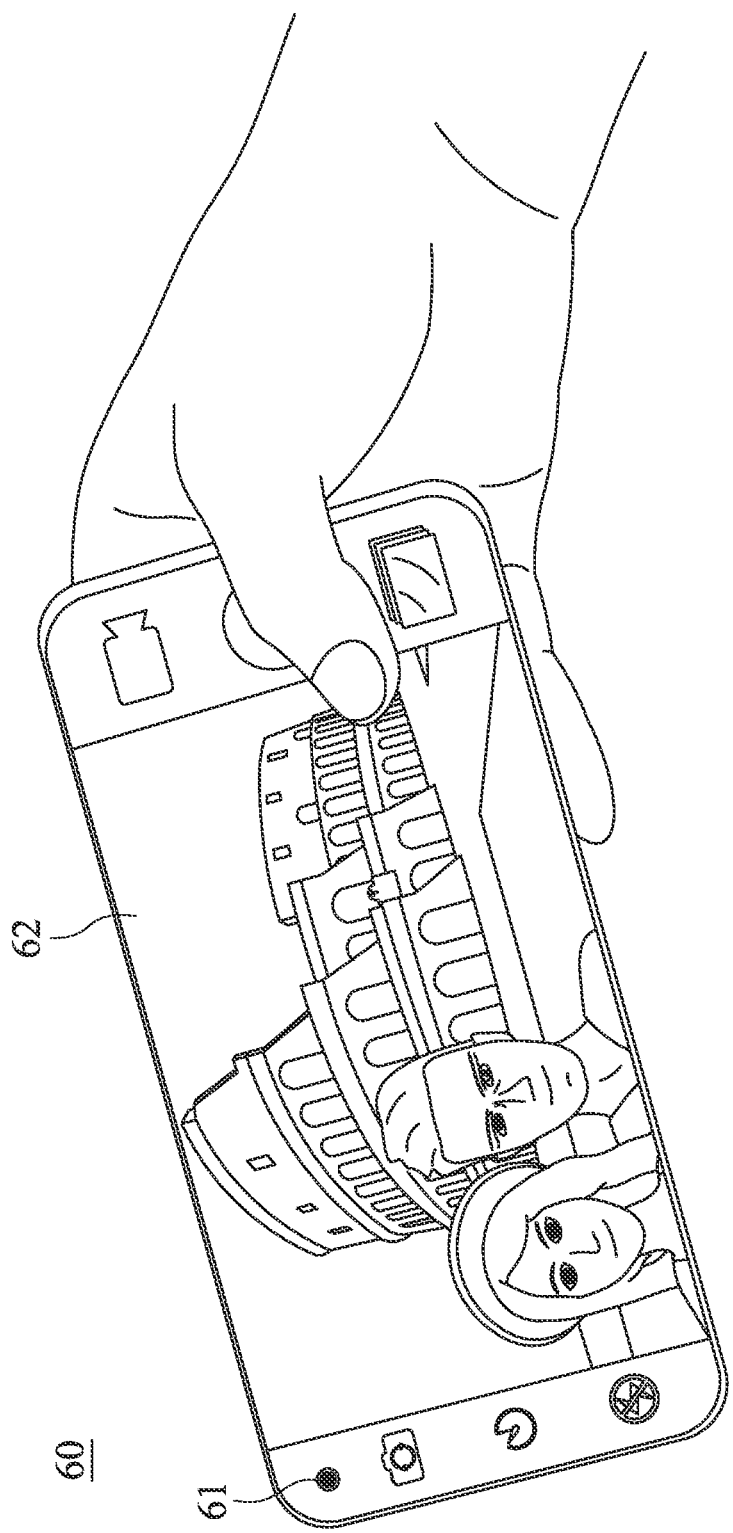
FIG. 6A is a schematic view of an electronic device according to the 6th embodiment of the present disclosure.
Figure 6B:
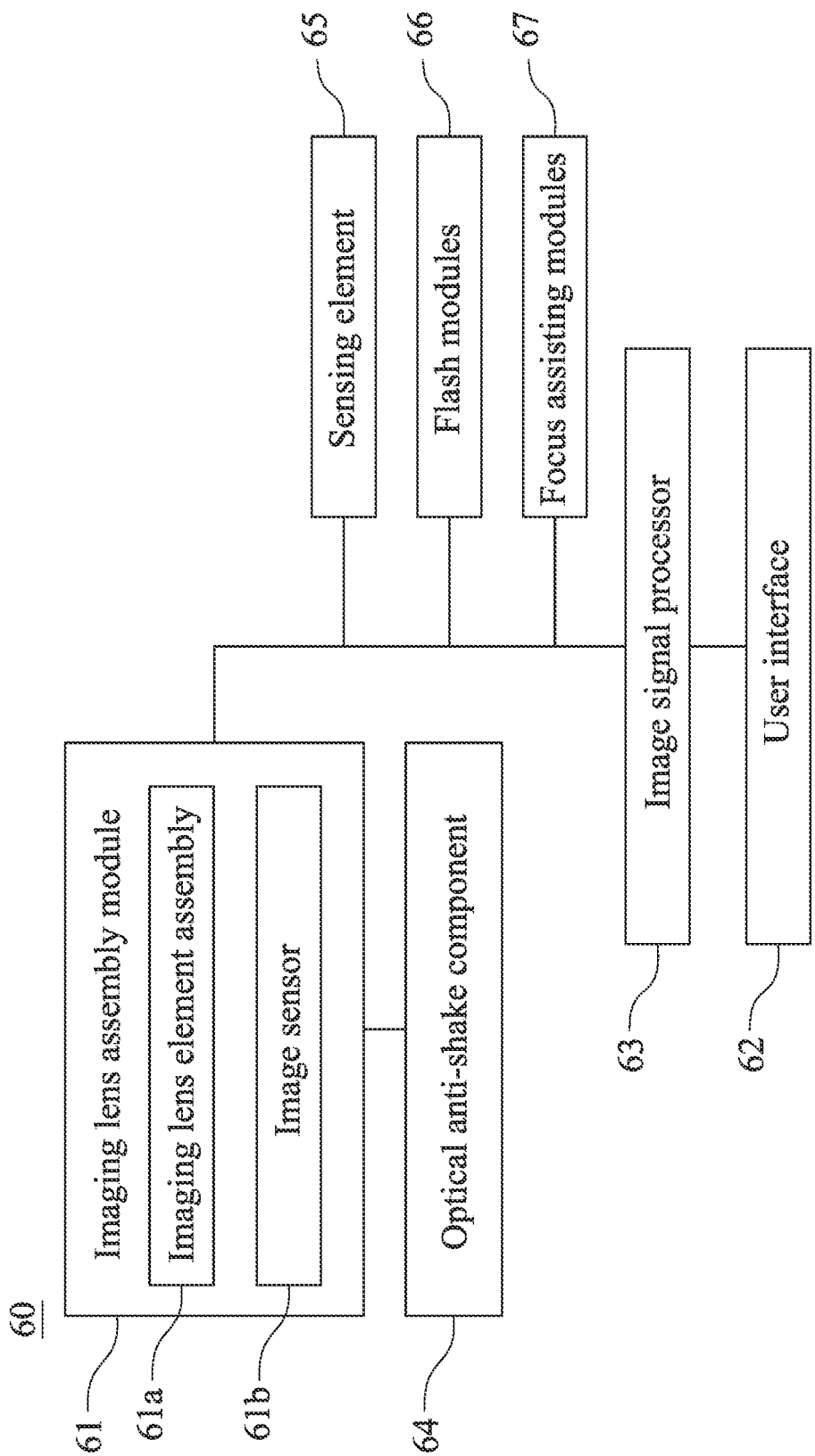
FIG. 6B is a block diagram of the electronic device according to the 6th embodiment of FIG. 6A.

FIG. 6A is a schematic view of an electronic device 60 according to the 6th embodiment of the present disclosure. FIG. 6B is a block diagram of the electronic device 60 according to the 6th embodiment of FIG. 6A. As shown in FIGS. 6A and 6B, the electronic device 60 is a smart phone and includes an imaging lens assembly module 61, wherein the imaging lens assembly module 61 includes an imaging lens element assembly 61a, an image sensor 61b and a plastic barrel (not shown). The imaging lens assembly module 61 of the 6th embodiment is disposed on a side of a user interface 62. The image sensor 61b is disposed on an image side (not shown) of the imaging lens assembly module 61. The user interface 62 can be a touch screen or a display screen, but the present disclosure will not be limited thereto. The imaging lens assembly module 61 can be any one of the aforementioned 1st to 5th embodiments, but the present disclosure will not be limited thereto.

In detail, a user activates a capturing mode via the user interface 62 of the electronic device 60. At this moment, the imaging lens assembly module 61 converges the imaging light on the image sensor 61b and outputs the electronic signals associated with the image to the image signal processor (ISP) 63.

In response to the camera specification of the electronic device 60, the electronic device 60 can further include an optical anti-shake component 64, which can be an OIS anti-shake feedback device. Further, the electronic device 60 can further include at least one auxiliary optical element (its reference numeral is omitted) and at least one sensing element 65. In the 6th embodiment, the auxiliary optical elements can be a flash module 66 and a focus assisting module 67. The flash module 66 can be for compensating for color temperatures. The focus assisting module 67 can be infrared distance measurement component and laser focus module, etc. The sensing element 65 can be with functions for sensing physical momentum and kinetic energies, such as an accelerator, a gyroscope, and a Hall Effect element, to sense shaking or jitters applied by hands of the user or external environments. As a result, the auto focus function and the optical anti-shake component 64 disposed on the imaging lens assembly module 61 of the electronic device 60 can function to obtain great imaging qualities and facilitate the electronic device 60 according to the present disclosure to have a capturing function with multiple modes, such as taking optimized selfies, high dynamic range (HDR) with a low light source, 4K resolution recording, etc. Additionally, the user can visually see the captured image of the camera through the touch screen and manually operate the view finding range on the touch screen to achieve the auto focus function of what you see is what you get.

Further, the electronic device 60 can further include, but not be limited to, a display, a control unit, a storage unit, a random access memory (RAM), a read-only memory (ROM), or the combination thereof.

Figure 6C:
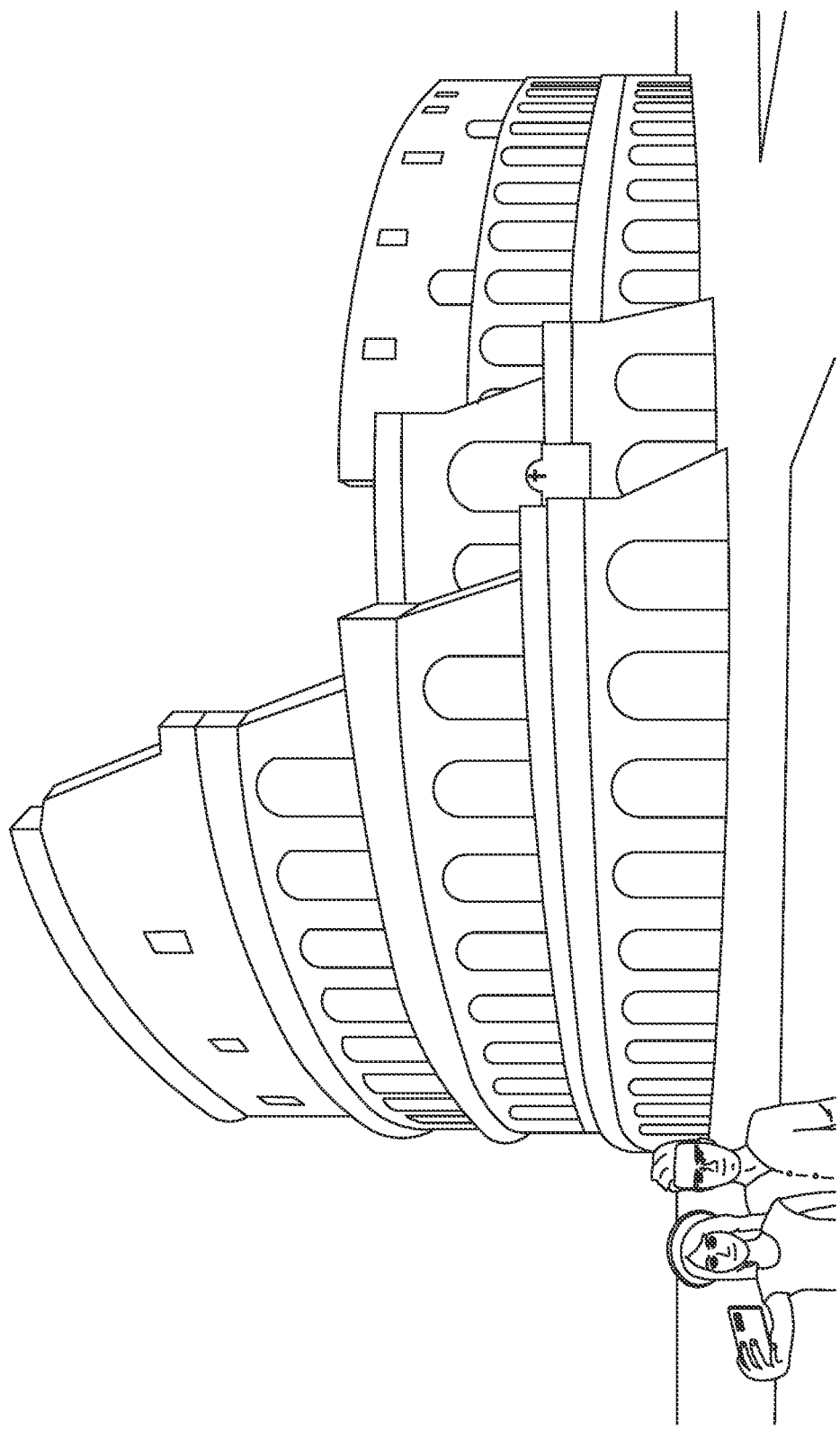
FIG. 6C is a schematic view of the selfie scene of the 6th embodiment in FIG. 6A.
Figure 6D:
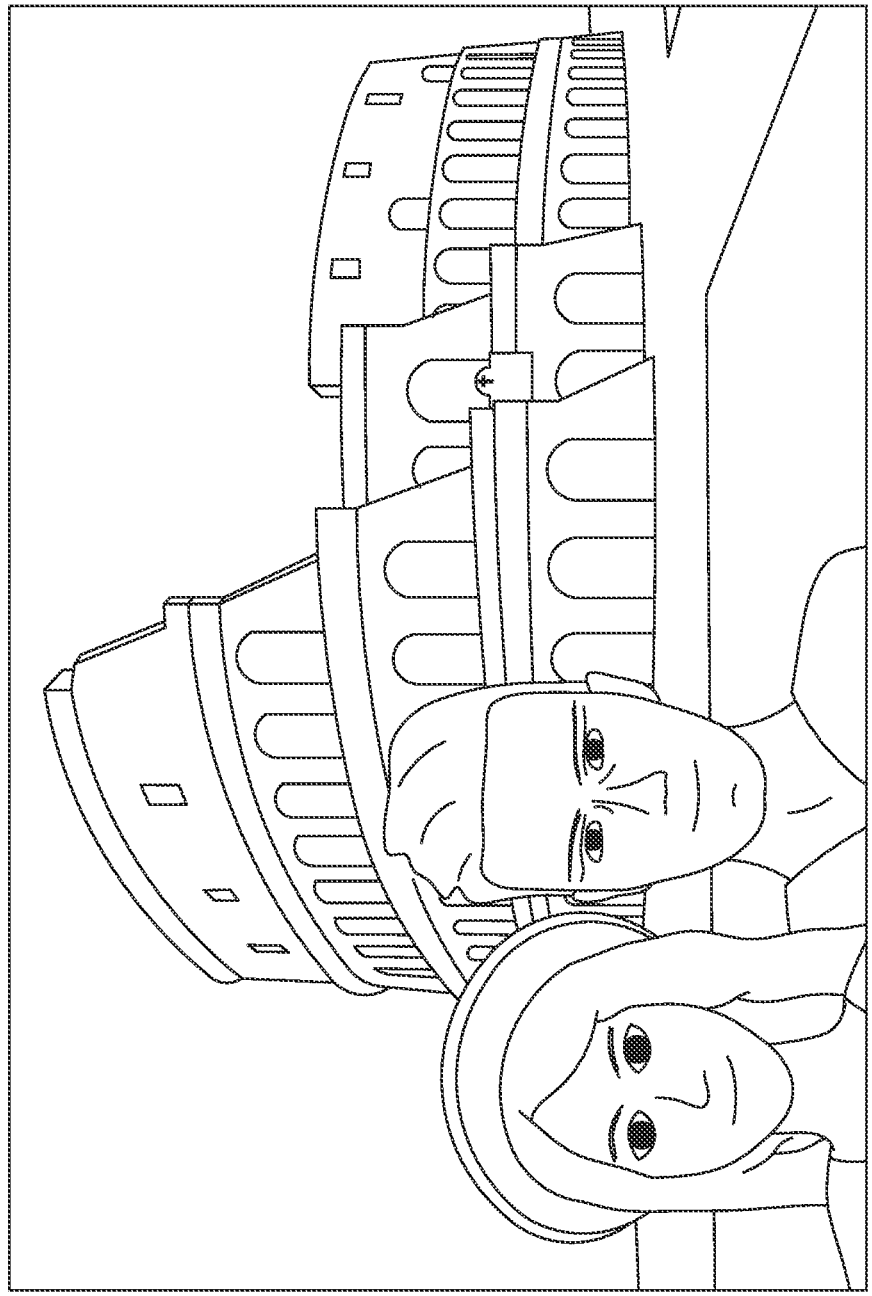
FIG. 6D is a schematic view of the shooting image of the 6th embodiment in FIG. 6A.

FIG. 6C is a schematic view of the selfie scene of the 6th embodiment in FIG. 6A. FIG. 6D is a schematic view of the shooting image of the 6th embodiment in FIG. 6A. As shown in FIGS. 6A to 6D, both of the imaging lens assembly module 61 and the user interface 62 face towards the user, when taking a selfie or living streaming, the user can simultaneously watch the captured image and perform the interface operation, and the image as shown in FIG. 6D can be obtained after shooting. Therefore, a better shooting experience can be provided by the imaging lens assembly module 61 of the present disclosure.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An imaging lens element assembly, comprising:
   a dual molded lens element, comprising:
   a transparent portion, in order from a center to a peripheral region, comprising:
   an optical effective area, wherein an optical axis of the imaging lens element assembly passes through the optical effective area; and
   a transparent peripheral area surrounding the optical effective area;
   a light absorbing portion surrounding the optical effective area, disposed on an object side of the transparent peripheral area, and comprising:

an object-end surface facing towards an object side of the light absorbing portion; and
an outer inclined surface extending from the object-end surface to an image side of the light absorbing portion and gradually far away from the optical axis; and
a step structure connected to a first outer diameter surface of the light absorbing portion and a second outer diameter surface of the transparent portion;
wherein a distance from the object-end surface to the step structure is Ld, a diameter of the first outer diameter surface is ψD, a diameter of a minimum opening of the light absorbing portion is ψd, and the following condition is satisfied:

$0.6 < Ld/((\psi D - \psi d)/2) < 2.5.$

2. The imaging lens element assembly of claim 1, wherein the diameter of the first outer diameter surface is ψD, an outer diameter of the object-end surface is ψo, and the following condition is satisfied:

$0.40 < \psi o/\psi D < 0.75.$

3. The imaging lens element assembly of claim 1, wherein a central thickness of the optical effective area is CT, a distance from an image-side center of the optical effective area to the object-end surface is FT, and the following condition is satisfied:

$1.0 < FT/CT < 1.2.$

4. The imaging lens element assembly of claim 1, wherein a central thickness of the optical effective area is CT, a minimum thickness of the transparent peripheral area is ET min, and the following condition is satisfied:

$ET\,\mathrm{min}/CT < 0.35.$

5. The imaging lens element assembly of claim 4, wherein the central thickness of the optical effective area is CT, the minimum thickness of the transparent peripheral area is ET min, and the following condition is satisfied:

$ET\,\mathrm{min}/CT \le 0.25.$

6. The imaging lens element assembly of claim 1, wherein the distance from the object-end surface to the step structure is Ld, and the following condition is satisfied:

$0.5\,\mathrm{mm} < Ld < 2.0\,\mathrm{mm}.$

7. The imaging lens element assembly of claim 1, wherein the distance from the object-end surface to the step structure is Ld, the diameter of the first outer diameter surface is ψD, the diameter of the minimum opening of the light absorbing portion is ψd, and the following condition is satisfied:

$0.8 < Ld/((\psi D - \psi d)/2) < 2.2.$

8. The imaging lens element assembly of claim 1, wherein the dual molded lens element further comprises at least one trace structure extending from the light absorbing portion to the transparent peripheral area.

9. An imaging lens assembly module, comprising:
the imaging lens element assembly of claim 1; and
a plastic barrel containing the imaging lens element assembly;
wherein the minimum opening of the light absorbing portion of the dual molded lens element of the imaging lens element assembly comprises:
a tip minimum opening forming an aperture stop of the imaging lens assembly module; and
two shrinking surfaces shrinking from the object side and the image side of the light absorbing portion to the tip minimum opening, respectively.

10. The imaging lens assembly module of claim 9, wherein the optical effective area comprises an object-side surface and an image-side surface, one of the object-side surface and the image-side surface is aspheric.

11. The imaging lens assembly module of claim 10, wherein an outer diameter of the object-side surface is ψY, the diameter of the minimum opening of the light absorbing portion is ψd, and the following condition is satisfied:

$0.7 < \psi d/\psi Y \le 1.$

12. The imaging lens assembly module of claim 10, wherein a distance from the tip minimum opening along a direction parallel to the optical axis towards the object side of the transparent portion to the object-side surface is d1, a distance from the tip minimum opening along the direction parallel to the optical axis towards the image side of the transparent portion to the image-side surface is d2, and the following condition is satisfied:

$0 \le d1/(d1+d2) < 0.8.$

13. The imaging lens assembly module of claim 9, wherein the light absorbing portion comprises at least one light diminishing structure composed of a plurality of stripe-shaped grooves, and each of the stripe-shaped grooves is arranged in at least one manner of being arranged in a circumferential direction and surrounding the optical axis of the imaging lens element assembly as a center.

14. The imaging lens assembly module of claim 13, wherein the at least one light diminishing structure is disposed on at least one of the two shrinking surfaces.

15. The imaging lens assembly module of claim 9, wherein the plastic barrel comprises a top surface facing towards an object side of the imaging lens assembly module, the object-end surface is disposed on an object side of the top surface, a distance from the object-end surface to the top surface is Lo, and the following condition is satisfied:

$0.3\,\mathrm{mm} < Lo < 1.5\,\mathrm{mm}.$

16. The imaging lens assembly module of claim 9, wherein the imaging lens element assembly further comprises an image lens element disposed on an image side of the dual molded lens element, the dual molded lens element comprises an axial connecting structure located at the transparent peripheral area and corresponding to the image lens element, the axial connecting structure comprises an annular plane and an inclined-tapered surface, the annular plane and the inclined-tapered surface are for axially connecting to the image lens element.

17. An imaging lens assembly module, comprising:
an imaging lens element assembly, comprising:
a dual molded lens element, comprising:
a transparent portion, in order from a center to a peripheral region, comprising:
an optical effective area, wherein an optical axis of the imaging lens element assembly passes through the optical effective area; and
a transparent peripheral area surrounding the optical effective area;
a light absorbing portion surrounding the optical effective area, disposed on an object side of the transparent peripheral area and comprising:
an object-end surface facing towards an object side; and
an outer inclined surface extending from the object-end surface to an image side of the light absorbing portion and gradually far away from the optical axis; and
a plastic barrel containing the imaging lens element assembly and comprising:

a top surface facing towards an object side of the imaging lens assembly module;

wherein the object-end surface is disposed on an object side of the top surface, a distance from the object-end surface to the top surface is Lo, and the following condition is satisfied:

$$0.3 \text{ mm} < Lo < 1.5 \text{ mm}.$$

18. The imaging lens assembly module of claim 17, wherein a diameter of a minimum opening of the plastic barrel is ψb, an outer diameter of the object-end surface is ψo, and the following condition is satisfied:

$$0.5 < \psi o/\psi b \leq 0.95.$$

19. The imaging lens assembly module of claim 17, wherein a central thickness of the optical effective area is CT, a distance from an image-side center of the optical effective area to the object-end surface is FT, and the following condition is satisfied:

$$1.0 < FT/CT < 1.2.$$

20. The imaging lens assembly module of claim 17, wherein a focal length of the imaging lens element assembly is f, a diameter of a minimum opening of the light absorbing portion is ψd, and the following condition is satisfied:

$$1.15 < f/\psi d < 2.80.$$

21. The imaging lens assembly module of claim 20, wherein the focal length of the imaging lens element assembly is f, the diameter of the minimum opening of the light absorbing portion is ψd, and the following condition is satisfied:

$$1.45 \leq f/\psi d \leq 2.50.$$

22. The imaging lens assembly module of claim 17, wherein the imaging lens element assembly further comprises an image lens element disposed on an image side of the dual molded lens element, the dual molded lens element comprises an axial connecting structure located at the transparent peripheral area and corresponding to the image lens element, the axial connecting structure comprises an annular plane and an inclined-tapered surface, the annular plane and the inclined-tapered surface are for axially connecting to the image lens element.

23. The imaging lens assembly module of claim 17, wherein a central thickness of the optical effective area is CT, a minimum thickness of the transparent peripheral area is ET min, and the following condition is satisfied:

$$ET \min/CT \leq 0.35.$$

24. The imaging lens assembly module of claim 23, wherein the central thickness of the optical effective area is CT, the minimum thickness of the transparent peripheral area is ET min, and the following condition is satisfied:

$$ET \min/CT \leq 0.25.$$

* * * * *